United States Patent
Khemani et al.

(10) Patent No.: US 6,573,340 B1
(45) Date of Patent: Jun. 3, 2003

(54) BIODEGRADABLE POLYMER FILMS AND SHEETS SUITABLE FOR USE AS LAMINATE COATINGS AS WELL AS WRAPS AND OTHER PACKAGING MATERIALS

(75) Inventors: Kishan Khemani, Santa Barbara, CA (US); Per Just Andersen, Santa Barbara, CA (US); Simon K. Hodson, Santa Barbara, CA (US); Harald Schmidt, Emmerich (DE)

(73) Assignee: Biotec Biologische Naturverpackungen GmbH & Co. KG (DE)

( * ) Notice: Subject to any disclaimer, the term of this patent is extended or adjusted under 35 U.S.C. 154(b) by 0 days.

(21) Appl. No.: 09/648,471

(22) Filed: Aug. 23, 2000

(51) Int. Cl.[7] .................................................. C08F 20/00
(52) U.S. Cl. .................... 525/437; 524/47; 524/539; 524/605; 525/444; 525/450; 525/452; 525/540; 428/480
(58) Field of Search ................... 524/47, 539, 605; 525/437, 444, 450, 452, 540; 428/480

(56) References Cited

U.S. PATENT DOCUMENTS

| | | | |
|---|---|---|---|
| 4,318,950 A | 3/1982 | Takashi et al. | |
| 4,364,985 A | 12/1982 | Tokuyama et al. | |
| 4,536,531 A | 8/1985 | Ogawa et al. | |
| 5,053,482 A | 10/1991 | Tietz | 528/272 |
| 5,080,665 A | 1/1992 | Jarrett et al. | 606/219 |
| 5,097,004 A | 3/1992 | Gallagher et al. | 528/272 |
| 5,097,005 A | 3/1992 | Tietz | 528/272 |
| 5,124,371 A | 6/1992 | Tokiwa et al. | |
| 5,171,308 A | 12/1992 | Gallagher et al. | 604/372 |
| 5,200,247 A | 4/1993 | Wu et al. | |
| 5,219,646 A | 6/1993 | Gallagher et al. | 428/287 |

(List continued on next page.)

FOREIGN PATENT DOCUMENTS

| | | | |
|---|---|---|---|
| EP | 0 400 532 A1 | 12/1990 | ............ C08L/23/08 |
| EP | 0 525 245 A1 | 2/1993 | ............ A61L/15/28 |
| EP | 0 539 541 B1 | 5/1993 | ............. C08L/3/02 |
| WO | WO 90/05161 | 5/1990 | .............. C08J/5/00 |
| WO | WO 92/09654 | 6/1992 | .............. C08L/1/14 |
| WO | WO 96/15173 | 5/1996 | ........... C08G/63/20 |
| WO | WO 96/15174 | 5/1996 | ........... C08G/63/60 |

OTHER PUBLICATIONS

U.S. patent application Ser. No. 09/210,539, Ishibashi et al., filed Dec. 14, 1998.
U.S. patent application Ser. No. 09/820,916, Holy, filed Mar. 30, 2001.

*Primary Examiner*—Samuel A. Acquah
(74) *Attorney, Agent, or Firm*—Workman, Nydegger & Seeley

(57) ABSTRACT

Biodegradable polymer blends suitable for laminate coatings, wraps and other packaging materials manufactured from at least one "hard" biopolymer and at least one "soft" biopolymer. "Hard" biopolymers tend to be more brittle and rigid and typically have a glass transition temperature greater than about 10° C. "Soft" biopolymers tend to be more flexible and pliable and typically have a glass transition temperature less than about 0° C. While hard and soft polymers each possess certain intrinsic benefits, certain blends of hard and soft polymers have been discovered which possess synergistic properties superior to those of either hard or soft polymers by themselves. Biodegradable polymers include polyesters, polyesteramides and thermoplastically processable starch. The polymer blends may optionally include an inorganic filler. Films and sheets made from the polymer blends may be textured so as to increase the bulk hand feel. Wraps will typically be manufactured so as to have good "dead-fold" properties so as to remain in a wrapped position and not spring back to an "unwrapped" and planar form. Laminate films will typically have good water vapor barrier properties as measured by the their Water Vapor Permeability Coefficient (WVPC).

32 Claims, 9 Drawing Sheets

U.S. PATENT DOCUMENTS

| | | | |
|---|---|---|---|
| 5,234,977 A | 8/1993 | Bastioli et al. | 524/47 |
| 5,236,762 A | 8/1993 | Suzuki et al. | |
| 5,252,642 A | 10/1993 | Sinclair et al. | 524/108 |
| 5,254,607 A | 10/1993 | McBride et al. | |
| 5,258,430 A | 11/1993 | Bastioli et al. | 524/52 |
| 5,262,458 A | 11/1993 | Bastioli et al. | 524/52 |
| 5,280,055 A | 1/1994 | Tomka | 524/47 |
| 5,286,770 A | 2/1994 | Bastioli et al. | 524/52 |
| 5,288,765 A | 2/1994 | Bastioli et al. | 521/84.1 |
| 5,292,782 A | 3/1994 | Bastioli et al. | 524/47 |
| 5,292,783 A | 3/1994 | Buchanan et al. | 524/37 |
| 5,295,985 A | 3/1994 | Romesser et al. | 604/358 |
| 5,296,229 A | 3/1994 | Grandjean | |
| 5,314,934 A | 5/1994 | Tomka | 524/53 |
| 5,354,616 A | 10/1994 | Fish, Jr. et al. | 428/373 |
| 5,360,830 A | 11/1994 | Bastioli et al. | 521/84.1 |
| 5,362,777 A | 11/1994 | Tomka | 524/47 |
| 5,407,979 A | 4/1995 | Wu et al. | |
| 5,412,005 A | 5/1995 | Bastioli et al. | 524/47 |
| 5,415,827 A | 5/1995 | Tomka et al. | 264/510 |
| 5,422,387 A | 6/1995 | Toms et al. | |
| 5,444,107 A | 8/1995 | Ajioka et al. | |
| 5,446,079 A | 8/1995 | Buchanan et al. | 524/41 |
| 5,462,980 A | 10/1995 | Bastioli et al. | 524/47 |
| 5,462,982 A | 10/1995 | Bastioli et al. | 524/47 |
| 5,512,378 A | 4/1996 | Bastioli et al. | 428/484 |
| 5,525,281 A | 6/1996 | Lörcks et al. | 264/101 |
| 5,534,150 A | 7/1996 | Bastioli et al. | 210/640 |
| 5,550,173 A | 8/1996 | Hammond et al. | |
| 5,559,171 A | 9/1996 | Buchanan et al. | 524/41 |
| 5,569,692 A | 10/1996 | Bastioli et al. | 524/47 |
| 5,580,911 A | 12/1996 | Buchanan et al. | 524/41 |
| 5,589,518 A | 12/1996 | Bastioli et al. | 521/55 |
| 5,599,858 A | 2/1997 | Buchanan et al. | 524/41 |
| 5,663,216 A | 9/1997 | Tomka | 523/128 |
| 5,700,344 A | 12/1997 | Edgington et al. | |
| 5,700,901 A | 12/1997 | Hurst et al. | 528/354 |
| 5,705,536 A | 1/1998 | Tomka | 521/84.1 |
| 5,726,220 A | 3/1998 | Tokushige et al. | |
| 5,760,144 A | 6/1998 | Ozeki et al. | |
| 5,766,748 A | 6/1998 | Ikado et al. | |
| 5,770,137 A | 6/1998 | Lörcks et al. | 264/109 |
| 5,783,271 A | 7/1998 | Nishida et al. | |
| 5,786,408 A | 7/1998 | Kuroda et al. | |
| 5,817,721 A | 10/1998 | Warzelhan et al. | 525/437 |
| 5,821,286 A | 10/1998 | Xu et al. | |
| 5,844,023 A | 12/1998 | Tomka | 524/47 |
| 5,866,634 A | 2/1999 | Tokushige et al. | |
| 5,883,199 A | 3/1999 | McCarthy et al. | |
| 5,897,944 A | 4/1999 | Loercks et al. | 428/316.6 |
| 5,900,322 A | 5/1999 | Buchanan et al. | 428/480 |
| 5,910,350 A | 6/1999 | Loracks et al. | 428/71 |
| 5,910,545 A | 6/1999 | Tsai et al. | |
| 5,916,950 A | 6/1999 | Obuchi et al. | |
| 5,939,467 A * | 8/1999 | Wnuk et al. | 523/128 |
| 6,054,218 A | 4/2000 | Nucci et al. | |
| 6,062,228 A | 5/2000 | Loercks et al. | 131/322 |
| 6,096,809 A | 8/2000 | Lorcks et al. | 524/47 |
| 6,117,925 A | 9/2000 | Tomka | 524/47 |
| 6,130,271 A | 10/2000 | Jarrett et al. | 523/113 |
| 6,136,097 A | 10/2000 | Lörcks et al. | 127/32 |
| 6,146,750 A | 11/2000 | Kotani et al. | |
| 6,150,490 A | 11/2000 | Deckwer et al. | |
| 6,194,483 B1 * | 2/2001 | Tsai et al. | 523/105 |
| 6,201,034 B1 | 3/2001 | Warzelhan et al. | 521/138 |
| 6,235,825 B1 | 5/2001 | Yoshida et al. | |
| 6,265,067 B1 | 7/2001 | Nucci et al. | |

* cited by examiner

BIODEGRADABLE POLYMER FILMS AND SHEETS SUITABLE FOR USE AS LAMINATE COATINGS AS WELL AS WRAPS AND OTHER PACKAGING MATERIALS

BACKGROUND OF THE INVENTION

1. The Field of the Invention

The present invention relates generally to biodegradable polymer blends. More particularly, the present invention relates to blends of two or more biopolymers, such as biodegradable polyesters and polyester amides, in order to yield sheets and films having improved physical properties such as flexibility and elongation. The biodegradable polymer blends may be suitable for a number of applications, such as in the manufacture of disposable wraps, bags and other packaging materials or as coating materials.

2. The Relevant Technology

As affluence grows, so does the ability to purchase and accumulate more things. Never before in the history of the world has their been such a large number of people with such tremendous buying power. The ability to purchase relatively inexpensive goods, such as books, tools, toys and food, is a luxury enjoyed by virtually all levels of society, even those considered to be at the poorer end of the spectrum. Because a large percentage of what is purchased must be prepackaged, there has been a tremendous increase in the amount of disposable packaging materials that are routinely discarded into the environment as solid waste. Thus, as society becomes more affluent, it generates more trash.

In many cases, packaging materials are intended for only a single use, such as boxes, cartons, pouches and wraps used to package many, if not most, commodities purchased from wholesale and retail outlets. Even the advent of computers and "paperless" transactions has not stemmed the rising tide of packaging wastes. Indeed, the onset of "e-commerce" has spawned a great mail-order fad, thus increasing, instead of decreasing, the amount of packaging materials being used as products must now be individually packed in boxes suitable for shipping.

Moreover, the incredibly fast-paced lifestyles now being pursued have greatly disrupted traditional eating routines in which people prepared their own meals and sat down as a family or group. Instead, people grab food on the run, thus creating ever-increasing amounts of fast food packaging materials being used and then immediately discarded. In view of the rising tide of disposable packaging materials, some countries, particularly those in Europe, have begun to mandate either the recycling of fast food generated wastes or the use of packaging materials which are "biodegradable" or "compostable". Environmental activists have also entered the fray to put pressure on companies that generate solid waste. Thus, large fast food chains such as McDonald's have been essentially forced to discontinue nonbiodegradable packaging materials such as foamed polystyrene, either by government fiat or by pressure by environmental groups. There is therefore an ever-present need to develop biodegradable alternatives to nonbiodegradable paper, plastics and metals.

In response to the demand for biopolymers, a number of new biopolymers have been developed which have been shown to biodegrade when discarded into the environment. Some of the larger players in the biodegradable plastics market include such well-known chemical companies as DuPont, BASF, Cargill-Dow Polymers, Union Carbide, Bayer, Monsanto, Mitsui and Eastman Chemical. Each of these companies has developed one or more classes or types of biopolymers. For example, both BASF and Eastman Chemical have developed biopolymers known as "aliphatic-aromatic" copolymers, sold under the trade names ECOFLEX and EASTAR BIO, respectively. Bayer has developed polyesteramides under the trade name BAK. Du Pont has developed BIOMAX, a modified polyethylene terephthalate (PET). Cargill-Dow has sold a variety of biopolymers based on polylactic acid (PLA). Monsanto developed, but has since stopped the manufacture of, a class of polymers known as polyhydroxyalkanoates (PHA), which include polyhydroxybutyrates (PHB), polyhydroxyvalerates (PHV), and polyhydroxybutyrate-hydroxyvalerate copolymers (PHBV). Union Carbide manufactures polycaprolactone (PCL) under the trade name TONE.

Each of the foregoing biopolymers has unique properties, benefits and weaknesses. For example, biopolymers such as BIOMAX, BAK, PHB and PLA tend to be strong but also quite rigid or even brittle. This makes them poor candidates when flexible sheets or films are desired, such as for use in making wraps, bags and other packaging materials requiring good bend and folding capability. In the case of BIOMAX, DuPont does not presently provide specifications or conditions suitable for blowing films therefrom, thus indicating that it may not be presently believed that films can be blown from BIOMAX.

On the other hand, biopolymers such as PCL, ECOFLEX and EASTAR BIO are many times more flexible compared to the more rigid biopolymers discussed immediately above. However, they have relatively low melting points such that they tend to be self adhering when newly processed and/or exposed to heat. While easily blown into films, such films are difficult to process on a mass scale since they will tend to self adhere when rolled onto spools, which is typically required for sale and transport to other locations and companies. To prevent self-adhesion (or "blocking") of such films, it is typically necessary to incorporate silica or other fillers.

Another important criteria for sheets and films used in packaging is temperature stability. "Temperature stability" is the ability to maintain desired properties even when exposed to elevated or depressed temperatures, or a large range of temperatures, which may be encountered during shipping or storage. For example, many of the more flexible biopolymers tend to become soft and sticky if heated significantly above room temperature, thus compromising their ability to maintain their desired packaging properties. Other polymers can become rigid and brittle upon being cooled significantly below freezing (i.e., 0° C.). Thus, a single homopolymer or copolymer may not by itself have sufficient stability within large temperature ranges.

In the case of the packaging of foods, such as refrigerated meats or fast foods, the packaging materials may be subjected to widely fluctuating temperatures, often being exposed to rapid changes in temperature. A biopolymer that may be perfectly suitable at room temperature, for example, may become completely unsuitable when used to wrap hot foods, particularly foods that emit significant quantities of hot water vapor or steam. In the case of meats, a wrapping that may be suitable when used at room temperature or below, such as at refrigeration or freezing temperatures, might become soft and sticky during microwave thawing of the meat. Of course, it would generally be unacceptable for a biopolymer to melt or adhere to the meat or fast food being served unless for some reason it was desired for the person to actually consume the biopolymer.

In view of the foregoing, it would be an advancement in the art to provide biodegradable polymers which could be readily formed into sheets and films that had strength and flexibility properties suitable for use as packaging materials.

In particular, it would be an advancement in the packaging art to provide improved biodegradable polymers which could be readily formed into sheets and films that were capable of being folded, sealed or otherwise manipulated in order to reliably enclose and seal a substrate therein.

It would be a further advancement in the art to provide improved biodegradable polymers which could be readily formed into sheets and films having sufficient flexibility while avoiding or minimizing problems such as undesired self-adhesion.

It would yet be an advancement in the art to provide improved biodegradable polymers which could be readily formed into sheets and films having increased temperature stability over a broad range of temperatures compared to existing biopolymers.

Such improved biopolymers are disclosed and claimed herein.

SUMMARY AND OBJECTS OF THE INVENTION

The present invention encompasses biodegradable polymer blends having improved strength, flexibility, elongation and temperature stability properties. Such polymer blends may be extruded, blown or otherwise formed into sheets and films for use in a wide variety of packaging materials, such as wraps, bags, pouches, and laminate coatings.

The invention achieves the foregoing improvements by blending at least one biopolymer having relatively high stiffness with at least one biopolymer having relatively high flexibility. For example, a blend containing a relatively stiff BIOMAX polymer, a modified PET sold by Du Pont, and the relatively soft or flexible ECOFLEX polymer, an aliphatic-aromatic copolymer sold by BASF, has been found to yield blends which have been shown to have strength and elongation properties which are superior to either biopolymer taken alone. Thus, the present invention has achieved a surprising synergistic effect of blending these two biopolymers.

BIOMAX is characterized as having a relatively high glass transition temperature and is highly crystalline at room temperature. Thus, BIOMAX tends to be quite stiff or brittle when formed into films or sheets. It also has poor elongation or elasticity. ECOFLEX, on the other hand, is characterized as having a relatively low glass transition temperature and is relatively amorphous or noncrystalline at room temperature, all of which contribute to the remarkable softness, elasticity and high elongation of ECOFLEX. Even so, the inventors have discovered the surprising result that various blends of BIOMAX and ECOFLEX actually exhibit higher elongation than ECOFLEX by itself, as well as higher break stress compared to either BIOMAX or ECOFLEX by themselves.

Other polymer blends have been considered, such as a blend of ECOFLEX, PLA and thermoplastically processable starch (TPS) and a blend of BAK and TPS. In each case, blending a biopolymer having a relatively low glass transition temperature with a biopolymer having a relatively high glass transition temperature has resulted in polymer blends that, in many cases, exhibit the desired characteristics of each polymer by itself, in some cases exhibiting even better properties, while diminishing or minimizing the negative properties of each biopolymer by itself.

In general, those biopolymers that may be characterized as being generally "stiff" or less flexible include those polymers which have a glass transition temperature greater than about 10° C., while biopolymers that may be characterized as being generously "flexible" include those polymers having a glass transition temperature of less than about 0° C. The stiff biopolymers will preferably have a glass transition temperature greater than about 20° C., more preferably greater than about 30° C., and most preferably greater than above 40° C. The flexible biopolymers will preferably have a glass transition temperature of less than about −10° C., more preferably less than about −20° C., and most preferably less than about −30° C.

In addition, "stiff" polymers are generally more crystalline, while "flexible" polymers are generally less crystalline and more amorphous. The relative stiff polymers, characterized as those polymers generally having a glass transition greater than about 10° C., will preferably have a concentration in a range from about 20% to about 99% by weight of the biodegradable polymer blend, more preferably in a range from about 50% to about 98% by weight, and most preferably in a range from about 80% to about 95% by weight of the polymer blend.

The relative soft polymers, characterized as those polymers generally having a glass transition less than about 0° C., will preferably have a concentration in a range from about 1% to about 80% by weight of the biodegradable polymer blend, more preferably in a range from about 2% to about 50% by weight, and most preferably in a range from about 5% to about 20% by weight of the polymer blend.

The biopolymers within the scope of the present invention are typically synthetic polyesters or polyester amides. Nevertheless, it is within the scope of the invention to also include a variety of natural polymers and their derivatives, such as polymers and derivatives derived from starch, cellulose, other polysaccharides and proteins. It is also within the scope of the present invention to incorporate inorganic fillers in order to decrease self-adhesion, lower the cost, and increase the modulus of elasticity (Young's modulus) of the polymer blends. In addition, a wide variety of plasticizers may be used in order to impart desired softening and elongation properties.

In the case of sheets or films intended to be used as "wraps", such as wraps used to enclose meats, other perishable food items, and especially fast food items (e.g., sandwiches, burgers and dessert items), it may be desirable to provide sheets and films having good "dead-fold" properties so that once folded, wrapped or otherwise manipulated into a desired orientation, such wraps will tend to maintain their orientation so as to not spontaneously unfold or unwrap, as which occurs with a large number of plastic sheets and films (e.g., polyethylene). In order to improve the dead-fold properties of sheets or films produced therefrom, biopolymer blends (optionally including fillers) may be engineered so as to yield films having a relatively high Young's modulus, preferably greater than about 100 MPa, more preferably greater than about 150 MPa, and most preferably greater than about 200 MPa. In general, increasing the concentration of the stiff biopolymer will tend to increase the Young's modulus.

As discussed above, including an inorganic filler is another way to increase Young's modulus. Thus, it has been found that adding significant quantities of an inorganic filler, such as greater than about 5% by weight, preferably greater than about 10% by weight, improves the dead-fold properties of sheets and films manufactured from such polymer blends.

Another way to increase the dead-fold properties is to increase the "bulk hand feel" of a sheet, which is done by disrupting the generally planar nature of the sheet or film. This can be done, for example, by embossing, crimping, quilting or otherwise texturing the sheet so as to have a series of hills and valleys rather than simply a planar sheet. This may be done, for example, by passing the sheet or film through a pair of knurled or other embossing- type rollers. Such texturing increases the ability of a sheet to take and maintain a fold, thus improving the dead-fold properties of the sheet.

Finally, another important advantage of utilizing biopolymers in the manufacture of wraps is that biopolymers are generally able to accept and retain print much more easily than conventional plastics or waxed papers. Many plastics and waxes are highly hydrophobic and must be surface oxidized in order to provide a chemically receptive surface to which ink can adhere. Biopolymers, on the other hand, typically include oxygen-containing moieties, such as ester or amide groups, to which inks can readily adhere.

In view of the foregoing, it is an object of the invention to provide biodegradable polymers which can be readily formed into sheets and films that have strength and flexibility properties suitable for use as packaging materials.

It is another object and feature of the invention to provide biodegradable polymers which can be readily formed into sheets and films that are capable of being folded, sealed or otherwise manipulated in order to reliably enclose and seal a substrate therein.

It is a further object of the invention to provide biodegradable polymers which can be readily formed into sheets and films having sufficient flexibility while avoiding or minimizing problems such as undesired self-adhesion.

It is yet an object of the invention to provide biodegradable polymers which can be readily formed into sheets and films having increased temperature stability over a broad range of temperatures compared to existing biopolymers.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

I. Introduction

Figure 1:
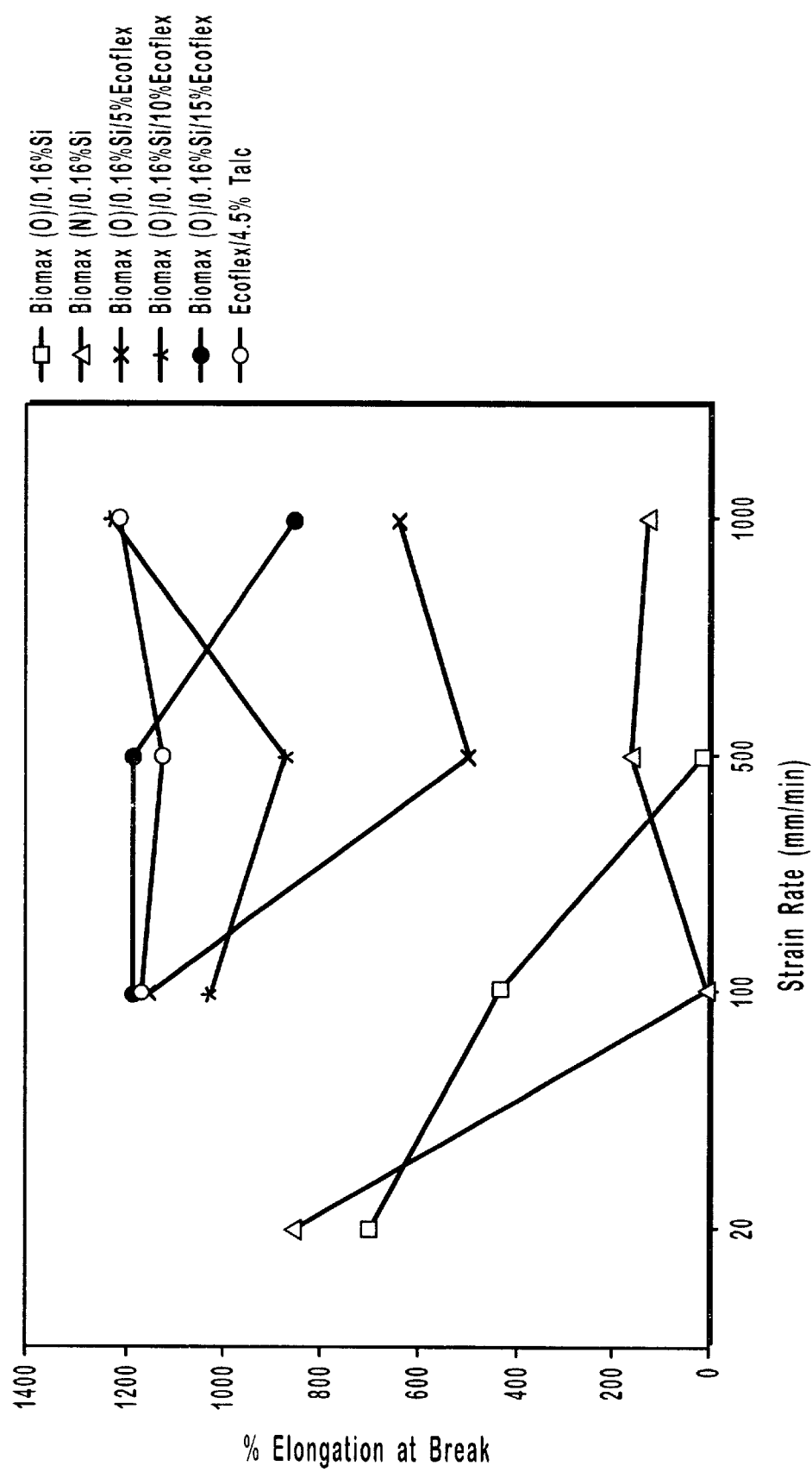
FIG. 1 is a plot of the percent elongation at break versus the applied strain rate for various neat and blended polymer films.

The present invention relates to biodegradable polymer blends having greatly improved properties compared to unblended biodegradable homopolymers and copolymers. Such properties include improved strength, flexibility, elongation and temperature stability. Moreover, such blends are superior to conventional plastics, which suffer from their inability to degrade when discarded in the environment, which are not readily printable absent special treatment, and which generally have poor dead-fold properties.

The polymer blends according to the invention include at least one biopolymer having relatively high stiffness and at least one biopolymer having relatively high flexibility. When blended together in the correct proportions, it is possible to derive the beneficial properties from each polymer while offsetting or eliminating the negative properties of each polymer if used separately to make films and sheets. The inventive polymer blends may be extruded, blown or otherwise formed into sheets and films for use in a wide variety of packaging materials, such as wraps, bags, pouches, and laminate coatings. By blending a relatively stiff polymer with a relatively flexible polymer, the inventors have discovered that, in some cases, the beneficial properties of the blend actually exceed the desirable properties of each polymer when used individually. Thus, the surprising result of an unexpected synergistic effect has been demonstrated.

The biopolymers within the scope of the present invention typically include synthetic polyesters or polyesteramides, but may also include a variety of natural polymers and their derivatives, such as polymers and derivatives of starch, cellulose, other polysaccharides and proteins. Inorganic fillers may be incorporated to improve the dead-fold properties, reduce cost and decrease self-adhesion. Plasticizers may be added to impart desired softening and elongation properties. The sheets and films may be embossed, crimped, quilted or otherwise textured to improve bulk hand feel and dead-fold. They readily accept and retain print much more easily than conventional plastics or waxed papers because they typically include oxygen-containing moieties, such as ester or amide groups, to which inks can readily adhere.

II. Biodegradable Polymers

Biopolymers within the scope of the present invention include polymers which degrade through the action of living organisms. Such polymers include a range of synthetic polymers, such as polyesters, polyester amides, polycarbonates and the like. Biodegradation reactions are typically enzyme-catalyzed and generally occur in aqueous media. Natural macromolecules containing hydrolyzable linkages, such as protein, cellulose and starch, are generally susceptible to biodegradation by the hydrolytic enzymes of microorganisms. A few man-made polymer, however, are also biodegradable. The hydrophilic/hydrophobic character of polymers greatly affects their biodegradability, with more polar polymers being more readily biodegradable as a general rule. Other important polymer characteristics that affect biodegradability include crystallinity and chain flexibility.

Besides being able to biodegrade, it is often important for a polymer or polymer blend to exhibit certain physical properties, such as stiffness, flexibility, water-resistance, strength, elongation, temperature stability, or gas permeability. The intended application of a particular polymer blend will often dictate which properties are necessary in order for a particular polymer blend, or article manufactured therefrom, to exhibit the desired performance criteria. In the case of sheets and films suitable for use as packaging materials, desired performance criteria may include elongation, dead-fold, strength, printability, imperviousness to liquids, breathability, temperature stability, and the like.

Because of the limited number of biodegradable polymers it is often difficult, or even impossible, to identify one single polymer or copolymer which meets all, or even most, of the desired performance criteria for a given application. This is particularly true in the area of packaging materials. Polymers that have a high glass transition temperature ($T_g$) are either very difficult to blow into films on a mass scale or, at the very least, tend to be too brittle for use as a packaging material such as a wrap. On the other hand, polymers that have a very low glass transition temperature also usually have relatively low softening and/or melting points, which makes them difficult to mass produce into sheets and films without the tendency of blocking, or self adhesion. Moreover, such sheets and films may lack adequate strength, water vapor barrier and/or modulus to be suitable for certain applications, such as in the manufacture of wraps or laminates coatings.

For these and other reasons, biodegradable polymers have found little use in the area of packaging materials, particularly in the field of wraps. Nevertheless, the inventors have discovered that sheets and films suitable for making wraps and other packaging materials can be obtained by blending one or more "stiff", or high glass transition temperature, polymers with one or more "soft", or low glass transition temperature, polymers.

A. Stiff Polymers

Even though the distinction between "stiff" and "soft" polymers may be somewhat arbitrary, such classifications are useful when determining which polymers to blend together in order to obtain a polymer blend having the desired performance criteria, particularly when the goal is to manufacture a film or sheet suitable for use as a laminate coating, such as on molded articles made of starch or other moisture sensitive materials, or as a wrap or other packaging material.

In general, those biopolymers that may be characterized as being "stiff", or less flexible, typically include polymers which have a glass transition temperature greater than about 10° C. Stiff biopolymers within the scope of the invention will preferably have a glass transition temperature greater than about 20° C., more preferably greater than about 30° C., and most preferably greater than above 40° C. The foregoing ranges attempt to take into consideration the fact that the "glass transition temperature" is not always a discreet temperature but is often a range of temperatures within which the polymer changes from being a glassy and more brittle material to being a softer and more flexible material.

The glass transition temperature should be distinguished from the melting point of a polymer, at or beyond which a thermoplastic polymer becomes plastic and deformable without significant rupture. Although there is often a positive correlation between a polymer's glass transition temperature ($T_g$) and its melting point ($T_m$), this is not strictly the case with all polymers. In some cases the difference between $T_g$ and $T_m$ may be large. In other cases it may be relatively small. It is generally the case, however, that the melting point of a stiffer polymer will typically be greater than the melting point of a softer polymer.

Preferred "stiff" biopolymers within the scope of the present invention include, but are not limited to, modified polyethylene terephthalates (such as those manufactured by Du Pont), polyesteramides (such as those manufactured by Bayer), polylactic acid-based polymers (such as those manufactured by Cargill-Dow Polymers and Dianippon Ink), terpolymers based on polylactic acid, polyglycolic acid and polycaprolactone (such as those manufactured by Mitsui Chemicals), polyalkylene carbonates (such as polyethylene carbonate manufactured by PAC Polymers), and polyhydroxybutyrate.

A particularly preferred stiff biopolymer within the scope of the invention includes a range of modified polyethylene terephthalate (PET) polymers manufactured by DuPont, and sold under the trade name BIOMAX. The modified PET polymers of DuPont are described in greater detail in U.S. Pat. No. 5,053,482 to Tietz, U.S. Pat. No. 5,097,004 to Gallagher et al., U.S. Pat. No. 5,097,005 to Tietz, U.S. Pat. No. 5,171,308 to Gallagher et al., U.S. Pat. No. 5,219,646, to Gallagher et al., and U.S. Pat. No. 5,295,985 to Romesser et al. For purposes of disclosing suitable "stiff" polymers that may be used in the manufacture of polymer blends according to the present invention, the foregoing patents are disclosed herein by specific reference.

In general, the modified PET polymers of DuPont may be characterized as comprising alternating units of terephthalate and an aliphatic constituent, with the aliphatic constituent comprising a statistical distribution of two or more different aliphatic units derived from two or more different diols, such as ethylene glycol, diethylene glycol, triethylene oxide, polyethylene glycol, lower alkane diols, both branched and unbranched, and derivatives of the foregoing. A portion of the aliphatic units may also be derived from an aliphatic diacid, such as adipic acid. In addition, a small percentage of the phenylene groups within the repeating terephthalate units are sulfonated and neutralized with an alkali metal or alkaline earth metal base. Both the aliphatic portion of the modified PET polymer as well as the statistically significant quantity of sulfonated terephthalate units contribute significantly to the biodegradability of the BIOMAX polymer.

Some BIOMAX grades of polymers have a melting point of 200–208° C. and a glass transition temperature of 40–60° C. BIOMAX 6926 is one such grade. It is a relatively strong and stiff polymer and, when blended with a softer polymer, yields excellent sheets and films suitable for wrapping and other packaging materials.

Another stiff polymer that may be used in manufacturing the polymer blends according to the present invention includes polylactic acid (PLA). PLA is a strong thermoplastic material that can be injection molded, extruded, thermoformed, or used as spun or melt-blown fibers to produce nonwoven goods. These polymers first found commercial application as medical sutures in 1970. High polymers of lactic acid ($M_n$=50,000–110,000) are strong thermoplastics that can be fabricated into useful products that can be broken down by common soil bacteria Potential applications of PLA include paper coatings for packaging (food and beverage cartons), plastic foam for fast foods, microwavable containers, and other consumer products such as disposable diapers or yard waste bags. PLA can be a homopolymer or it may be copolymerized with glycolides, lactones or other monomers. One particularly attractive feature of PLA-based polymers is that they are derived from renewable agricultural products.

Because lactic acid is difficult to polymerize directly to high polymers in a single step on a commercial scale, most companies employ a two-step process. Lactic acid is first oligomerized to a linear chain with a molecular weight of less than 3000 by removing water. The oligomer is then depolymerized to lactide, which is a cyclic dimer consisting of two condensed lactic acid molecules. This six-member ring is purified and subjected to ring opening polymerization to produce polylactic acid with a molecular weight of 50,000–110,000.

Because lactic acid has an a-symmetric carbon atom, it exists in several isomeric forms. The lactic acid most commonly sold commercially contains equal parts of L-(+)-lactic acid and D-(−)-lactic acid and is therefore optically inactive, with no rotatory power. The racemic mixture is called DL-lactic acid.

Polylactic acid typically has a glass transition temperature of about 59° C. and a melting point of about 178° C. It has low elongation and is quite hard.

Another stiff polymer that may be used within the inventive polymer blends is known as CPLA, which is a derivative of PLA and is sold by Dianippon Ink. Two classes of CPLA are sold and are referred to as "CPLA hard" and "CPLA soft", both of which are "stiff polymers as that term has been defined herein. CPLA hard has a glass transition temperature of 60° C., while CPLA soft has a glass transition temperature of 51° C.

Bayer corporation manufactures polyesteramides sold under the name BAK. One form of BAK is prepared from adipic acid, 1,4-butanediol, and 6-aminocaproic acid. BAK 1095, a polyesteramide having an $M_n$ of 22,700 and an $M_w$ of 69,700 and which contains aromatic constituents, has a melting point of 125° C. BAK 2195 has a melting point of 175° C. Although the glass transition temperatures of BAK 1095 and BAK 2195 are difficult to measure, because BAK appears to behave like a stiff polymer in the sense that improved properties may be obtained by blending BAK with a soft polymer, the inventors believe that the glass transition temperature of BAK polymers is essentially at least about 10° C.

Mitsui Chemicals, Inc. manufactures a terpolymer that includes units derived from polylactide, polyglycolide and polycaprolactone that have been condensed together. Thus, this polymer is an aliphatic polymer and may be characterized as a PLA/PGA/PCL terpolymer. Three grade of this polymer are available, H100J, S100 and T100. The H100J grade PLA/PGA/PCL terpolymer has been analyzed to have a glass transition temperatures of 74° C. and a melting point of 173° C.

PAC Polymers Inc. manufactures polyethylene carbonate (PEC) having a glass transition temperature range of 10–28° C. PEC is a stiff polymer for purposes of manufacturing polymer blends according to the present invention B. Soft Polymers In general, those biopolymers that may be characterized as being "soft", or less rigid, typically include polymers which have a glass transition temperature of less than about 0° C. Soft biopolymers within the scope of the invention will preferably have a glass transition temperature of less than about −10° C., more preferably less than about −20° C., and most preferably less than about −30° C. The foregoing ranges attempt to take into consideration the fact that the "glass transition temperatures" of "soft" polymers are not always discreet temperatures but are often a range of temperatures.

Preferred "soft" biopolymers within the scope of the present invention include, but are not limited to, aliphatic-aromatic copolyesters (such as those manufactured by BASF and Eastman Chemical), aliphatic polyesters which include repeating units having at least 5 carbon atoms, e.g., polyhydroxyvalerate, polyhydroxybutyrate-hydroxyvalerate copolymer and polycaprolactone (such as those manufactured by Daicel Chemical, Monsanto, Solvay, and Union Carbide), and succinate-based aliphatic polymers, e.g., polybutylene succinate (PBS), polybutylene succinate adipate (PBSA), and polyethylene succinate (PES) (such as those manufactured by Showa High Polymer).

U.S. Pat. No. 5,817,721 to Warzelhan et al., and assigned to BASF, discloses a range of aliphatic-aromatic copolyesters within the scope of the invention. Similarly, U.S. Pat. Nos. 5,292,783, 5,446,079, 5,559,171, 5,580,911, 5,599,858 and 5,900,322, all to Buchanan et al. and assigned to Eastman Chemical, each disclose aliphatic-aromatic copolyesters within the scope of the invention. For purposes of disclosing "soft" polymers within the scope of the invention, the foregoing patents are incorporated herein by specific reference.

A preferred "soft" polymer that may be used in the manufacture of the inventive polymer blends includes aliphatic-aromatic copolyesters manufactured by BASF and sold under the trade name ECOFLEX. The aliphatic-aromatic copolyesters manufactured by BASF comprise a statistical copolyester derived from 1,4-butanediol, adipic acid, and dimethylterephthalate (DMT). In some cases, a diisocyanate is used as a chain lengthener.

Copolymerization of aliphatic monomers with aromatic monomers such as terephthalic acid (or diester derivatives such as DMT) is one way to improve the performance properties of aliphatic polyesters. However, questions have been raised within the industry regarding the complete biodegradability of aliphatic-aromatic copolyesters because aromatic copolyesters such as PET are resistant to microbial attack. Nevertheless, researchers have discovered that aliphatic-aromatic copolyesters are indeed biodegradable and that the biodegradability of these copolyesters is related to the length of the aromatic sequence. Block copolyesters with relatively long aromatic sequences are not rapidly degraded by microorganisms. Film thickness is also a factor, which thicker films degrading more slowly due to their reduced surface to volume ratio. The polymer presently sold under the name ECOFLEX by BASF has a glass transition temperature of −33° C. and a melting range of 105–115° C.

Another "soft" aliphatic-aromatic copolyester is manufactured by Eastman Chemical Company and is sold under the trade name EASTAR BIO. The aliphatic-aromatic copolyester manufactured by Eastman is a random copolymer derived from 1,4-butanediol, adipic acid, and dimethylterephthalate (DMT). One particular grade of EASTAR BIO, known as EASTAR BIO 14766, has a glass transition temperature of −33° C. and a melting point of 112° C. It has a tensile strength at break in the machine direction of 19 MPa, an elongation at break of 600%, and a tensile modulus of elasticity of 97 MPa (tangent). It has an elmendorf tear strength of 282 g.

Polycaprolactone (PCL) is a biodegradable aliphatic polyester having a relatively low melting point and a very low glass transition temperature. It is so named because it is formed by polymerizing E-caprolactone. The glass transition temperature of PCL is −60° C. and the melting point is only 60° C. Because of this, PCL and other similar aliphatic polyesters with low melting points are difficult to process by conventional techniques such as film blowing and blow molding. Films made from PCL are tacky as extruded and have low melt strength over 130° C. Also, the slow crystallization of this polymer causes the properties to change over time. Blending PCL with other polymers improves the processability of PCL. One common PCL is TONE, manufactured by Union Carbide. Other manufactures of PCL include Daicel Chemical, Ltd. and Solvay.

ε-Caprolactone is a seven member ring compound that is characterized by its reactivity. Cleavage usually takes place at the carbonyl group. ε-Caprolactone is typically made from cyclohexanone by a peroxidation process. PCL is a polyester made by polymerizing ε-caprolactone. Higher molecular weight PCL may be prepared under the influence of a wide variety of catalysts, such as aluminum alkyls, organometallic compositions, such as Group Ia, IIa, IIb, or IIIa metal alkyls, Grignard reagents, Group II metal dialkyls, calcium or other metal amides or alkyl amides, reaction products of alkaline earth hexamoniates, alkaline oxides and acetonitrile, aluminum trialkoxides, alkaline earth aluminum or boron hydrides, alkaline metal or alkaline earth hydrides or alkaline metals alone. PCL is typically prepared by initiation with an aliphatic diol (HO—R—OH), which forms a terminal end group.

Another "soft" aliphatic polyester that may be used in manufacturing the inventive polymer blends is polyhydroxybutyrate-hydroxyvalerate copolymer (PHBV), which is manufactured using a microbial-induced fermentation. One such PHBV copolyester is manufactured by Monsanto Company and has a glass transition temperature of about 0° C. and a melting point of about 170° C.

In the fermentation process of manufacturing PHBV, a single bacterium species converts corn and potato feed stocks into a copolymer of polyhydroxybutyrate and hydroxyvalerate constituents. By manipulating the feed stocks, the proportions of the two polymer segments can be varied to make different grades of material. All grades are moisture resistant while still being fully biodegradable. The world producers of PHBV are Monsanto, with its BIOPOL product, and METABOLIX, with its various grades of polyhydroxy-alkanoates (PHAs).

Another class of "soft" aliphatic polyesters are based on repeating succinate units such as polybutylene succinate (PBS), polybutylene succinate adipate (PBSA), and polyethylene succinate (PES). Each of these succinate-based aliphatic polyesters are manufactured by Showa High Polymer, Ltd. and are sold under the trade name BIONELLE. PBS (Bionolle 1001) has a glass transition temperature of −30° C. and a melting point of 114° C. PBSA (Bionolle 3001) has a glass transition temperature of −35° C. and a melting point of 95° C. PES (Bionolle 6000) has a glass transition temperature of −4° C. and a melting point of 102° C.

The target applications for BIONOLLE include films, sheets, filaments, foam-molded products and foam-expanded products. BIONOLLE is biodegradable in compost, in moist soil, in water with activated sludge, and in sea water. PBSA degrades rapidly in a compost environment, so it is similar to cellulose, whereas PBS degrades less rapidly and is similar to newspaper in terms of biodegradation.

BIONOLLE is manufactured according to a patented two-step process of preparing succinate aliphatic polyesters with high molecular weights and useful physical properties. In a first step, a low molecular weight hydroxy-terminated aliphatic polyester prepolymer is made from a glycol and an aliphatic dicarboxylic acid. This polymerization is catalyzed by a titanium catalyst such as tetraisopropyltitanate, tetraisopropoxy titanium, dibutoxydiacetoacetoxy titanium, or tetrabutyltitanate. In the second step, a high molecular weight polyester is made by reacting a diisocyanate, such as hexamethylene diisocyante (HMDI) with a polyester prepolymer.

Showa manufactures PBS by first reacting 1,4-butanediol with succinic acid in a condensation reaction to form a prepolymer and then reacting the prepolymer with HMDI as a chain extender.

PBSA copolymer is manufactured by first condensing 1,4-butanediol, succinic acid and adipic acid to form a prepolymer and then reacting the prepolymer with HMDI as a chain extender.

PES homopolymer is prepared by reacting ethylene glycol and succinic acid and using HMDI or diphenylmethane diisocyanate as a chain extender.

Succinate-based aliphatic polyesters are also manufactured by Mitsui Toatsu, Nippon Shokubai, Cheil Synthetics, Eastman Chemical, and Sunkyon Industries.

Finally, although starch, such as modified starch, is known to have a high glass transition temperature (i.e., 70–85° C.) and be very crystalline at room temperature, certain forms of starch in which the crystallinity has been greatly reduced or destroyed altogether have very low glass transition temperatures and may, in fact, constitute "soft" biodegradable polymers within the scope of the invention. For example, U.S. Pat. No. 5,362,777 to Tomka is a landmark patent and was the first attempt to manufacture what is known as thermoplastically processable starch (TPS). TPS is characterized as a thermoplastic starch polymer formed by mixing and heating native or modified starch in the presence of an appropriate high boiling plasticizer (such as glycerin and sorbitol) in a manner such that the starch has little or no crystallinity, a low glass transition temperature, and very low water (less than 5%, preferably less than about 1% by weight while in a melted state after venting and prior to conditioning). When blended with appropriate hydrophobic polymers, such as the stiff polymers disclosed herein, e.g., polyesteramides such as BAK, TPS can have a glass transition temperature as low as −60° C., and typically below about −20° C.

III. Optional Components

There are a number of optional components which may be included within the biodegradable polymer blends of the present invention in order to impart desired properties. These include, but are not limited to, plasticizers, fillers, natural polymers and nonbiodegradable polymers.

A. Plasticizers

Plasticizers may be added in order to improve processing, such as extrusion and/or film blowing, or final mechanical properties, particularly of polymer blends that are relatively stiff. A stiffer polymer blend may be dictated by other performance criteria, such as high temperature stability, strength, lower elongation, higher dead-fold, resistance to "blocking" during and after processing, and the like. In such cases, a plasticizer may be necessary in order to allow the polymer blend to satisfy certain processing and/or performance criteria.

Suitable plasticizers within the scope of the invention, particularly when incorporated into a polymer blend that is intended to be used in the manufacture of wraps and other packaging materials that will come into contact with food, will preferably be safe if consumed, at least in smaller quantities.

Optional plasticizers that may be used in accordance with the present invention include, but are not limited to, soybean oil, caster oil, TWEEN 20, TWEEN 40, TWEEN 60, TWEEN 80, TWEEN 85, sorbitan monolaurate, sorbitan monooleate, sorbitan monopalmitate, sorbitan trioleate, sorbitan monostearate, PEG, derivatives of PEG, N,N-ethylene bis-stearamide, N,N-ethylene bis-oleamide, polymeric plasticizers such as poly(1,6-hexamethylene adipate), and other compatible low molecular weight polymers.

B. Solid Fillers

Fillers may optionally be added for a number of reasons, including but not limited to, increasing the Young's modulus, the dead-fold properties and rigidity, and decreasing the cost and tendency of the polymer blend to "block" or self-adhere during processing. Certain fillers, like fibers having a high aspect ratio, may increase the strength, fracture energy and dead-fold properties of the sheets and films according to the invention. The fillers within the scope of the invention will generally fall within three classes or categories: (1) inorganic particulate fillers, (2) fibers and (3) organic fillers.

1. Inorganic Particulate Fillers

The terms "particle" or "particulate filler" should be interpreted broadly to include filler particles having any of a variety of different shapes and aspect ratios. In general, "particles" are those solids having an aspect ratio (ie., the ratio of length to thickness) of less than about 10:1. Solids having an aspect ratio greater than about 10:1 may be better understood as "fibers", as that term will be defined and discussed hereinbelow.

Virtually any known filler, whether inert or reactive, can be incorporated into the biodegradable polymer blends. In general, adding an inorganic filler will tend to greatly reduce the cost of the resulting polymer blend. If a relatively small amount of inorganic filler is used, the effects on the strength of the final composition are minimized, while adding a relatively large amount of inorganic filler will tend to maximize those effects. In those cases where adding the inorganic filler will tend to detract from a critical physical parameter, such as tensile strength or flexibility, only so much of the filler should be added in order to reduce the cost of the resulting composition while retaining adequate mechanical properties required by the intended use. However, in those cases where adding the inorganic filler will improve one or more desired physical properties of a given application, such as stiffness, compressive strength, and dead-fold, it may be desirable to maximize the quantity of added filler in order to provide this desired property while also proving greatly decreased cost.

It will be appreciated that one of ordinary skill in the art, using a microstructural engineering approach, can select the types and amount of the various inorganic fillers that may be included within the polymer blend in order to engineer a final material having the desired strength properties while taking advantage of the cost-reducing properties of adding the inorganic filler.

In general, in order to maximize the quantity of inorganic filler while minimizing the deleterious mechanical effects of adding the filler as much as possible, it will generally be preferable to select filler particles in a manner that decreases the specific surface area of the particles. The specific surface area is defined as the ratio of the total particle surface area versus the total particle volume. One way to decrease the specific surface area is to select particles that have a more uniform surface geometry. The more jagged and irregular the particle surface geometry, the greater will be the ratio of surface area to volume of that particle. Another way to decrease the specific surface area is to increase the particle size. In view of the advantages of decreasing the specific surface area of the inorganic filler, it will be preferable to include inorganic filler particles having a specific surface area in a range from about 0.1 $m^2/g$ to about 400 $m^2/g$, more preferably in range from about 0.15 $m^2/g$ to about 50 $m^2/g$, and most preferably in a range from about 0.2 $m^2/g$ to about 2 $m^2/g$.

Related to decreased specific surface area in improving the rheology and final strength properties of the polymer blends of the present invention is the concept of particle packing. Particle packing techniques allow for a reduction in wasted interstitial space between particles while maintaining adequate particle lubrication and, hence, mixture rheology, within the melted polymer blend while also allowing for more efficient use of the thermoplastic phase as a binder in the final hardened polymer blends of the present invention. Simply stated, particle packing is the process of selecting two or more ranges of particle sizes in order that the spaces between a group of larger particles is substantially occupied by a selected group of smaller particles.

In order to optimize the packing density of the inorganic filler particles, differently sized particles having sizes ranging from as small as about 0.01 micron to as large as about 2 mm may be used. Of course, the thickness and other physical parameters of the desired article to be manufactured from any given polymer blend may often dictate the upper particle size limit. In general, the particle packing will be increased whenever any given set of particles is mixed with another set of particles having a particle size (i.e., width and/or length) that is at least about 2 times bigger or smaller than the first group of particles. The particle packing density for a two-particle system will be maximized whenever the size ratio of a given set of particles is from about 3–10 times the size of another set of particles. Similarly, three or more different sets of particles may be used to further increase the particle packing density.

The degree of packing density that will be "optimal" will depend on a number of factors including, but not limited to, the types and concentrations of the various components within both the thermoplastic phase and the solid filler phase, the shaping method that will be employed, and the desired mechanical and other performance properties of the final articles to be manufactured from a given polymer blend. One of ordinary skill in the art will be able to determine the optimal level of particle packing that will optimize the packing density through routine testing. A more detailed discussion of particle packing techniques can be found in U.S. Pat. No. 5,527,387 to Andersen et al. For purposes of disclosing particle packing techniques useful in practicing the present invention, the foregoing patent is incorporated herein by specific reference.

In those cases where it is desired to take advantage of the improved properties of rheology and binding efficiency utilizing particle packing techniques, it will be preferable to include inorganic filler particles having a particle packing density in a range from about 0.5 to about 0.95, more preferably in range from about 0.6 to about 0.9, and most preferably in a range from about 0.7 to about 0.8.

Examples of useful inorganic fillers that may be included within the biodegradable polymer blends include such disparate materials as sand, gravel, crushed rock, bauxite, granite, limestone, sandstone, glass beads, aerogels, xerogels, mica, clay, alumina, silica, kaolin, microspheres, hollow glass spheres, porous ceramic spheres, gypsum dihydrate, insoluble salts, calcium carbonate, magnesium carbonate, calcium hydroxide, calcium aluminate, magnesium carbonate, titanium dioxide, talc, ceramic materials, pozzolanic materials, salts, zirconium compounds, xonotlite (a crystalline calcium silicate gel), lightweight expanded clays, perlite, vermiculite, hydrated or unhydrated hydraulic cement particles, pumice, zeolites, exfoliated rock, ores, minerals, and other geologic materials. A wide variety of other inorganic fillers may be added to the polymer blends, including materials such as metals and metal alloys (e.g., stainless steel, iron, and copper), balls or hollow spherical materials (such as glass, polymers, and metals), filings, pellets, flakes and powders (such as microsilica).

The particle size or range of particle sizes of the inorganic fillers will depend on the wall thickness of the film, sheet, or other article that is to be manufactured from the polymer blend. In general, the larger the wall thickness, the larger will be the acceptable particle size. In most cases, it will be preferable to maximize the particle size within the acceptable range of particle sizes for a given application in order to reduce the cost and specific surface area of the inorganic filler. For films that are intended to have a substantial amount of flexibility, tensile strength and bending endurance (e.g., plastic bags) the particle size of the inorganic filler will preferably be less than about 10% of the wall thickness of the film. For example, for a blown film having a thickness of 40 microns, it will be preferable for the inorganic filler particles to have a particle size of about 4 microns or less.

The amount of particulate filler added to a polymer blend will depend on a variety of factors, including the quantity and identities of the other added components, as well as the specific surface area and/or packing density of the filler particles themselves. Accordingly, the concentration of particulate filler within the polymer blends of the present invention may be included in a broad range from as low as about 5% by volume to as high as about 90% by volume of the polymer blend. Because of the variations in density of the various inorganic fillers than can be used, it may be more correct in some instances to express the concentration of the inorganic filler in terms of weight percent rather than volume percent. In view of this, the inorganic filler components can be included within a broad range from as low as 5% by weight to as high as 95% by weight of the polymer blend.

In those cases where it is desired for the properties of the thermoplastic phase to predominate due to the required performance criteria of the articles being manufactured, the inorganic filler will preferably be included in an amount in a range from about 5% to about 50% by volume of polymer blend. On the other hand, where it is desired to create highly inorganically filled systems, the inorganic filler will preferably be included in an amount in a range from about 50% to about 90% by volume.

In light of these competing objectives, the actual preferred quantity of inorganic filler may vary widely. In general terms, however, in order to appreciably decrease the cost of the resulting polymer blend, the inorganic filler component will preferably be included in an amount greater than about 15% by weight of the polymer blend, more preferably in an amount greater than about 25% by weight, more especially preferably in an amount greater than about 35% by weight, and most preferably in an amount greater than about 50% by weight of the polymer blend.

When included simply to improve dead-fold, the inorganic filler may be included in any amount, such as in an amount greater than about 3% by weight, preferably greater than about 5% by weight, and more preferably greater than about 10% of the polymer blend.

2. Fibers

A wide range of fibers can optionally be used in order to improve the physical properties of the polymer blends. Like the aforementioned fillers, fibers will typically constitute a solid phase that is separate and distinct from the thermoplastic phase. However, because of the shape of fibers, i.e., by having an aspect ratio greater than at least about 10:1, they are better able to impart strength and toughness than particulate fillers. As used in the specification and the appended claims, the terms "fibers" and "fibrous material" include both inorganic fibers and organic fibers. Fibers may be added to the moldable mixture to increase the flexibility, ductility, bendability, cohesion, elongation ability, deflection ability, toughness, dead-fold, and fracture energy, as well as the flexural and tensile strengths of the resulting sheets and articles.

Fibers that may be incorporated into the polymer blends include naturally occurring organic fibers, such as cellulosic fibers extracted from wood, plant leaves, and plant stems. In addition, inorganic fibers made from glass, graphite, silica, ceramic, rock wool, or metal materials may also be used. Preferred fibers include cotton, wood fibers (both hardwood or softwood fibers, examples of which include southern hardwood and southern pine), flax, abaca, sisal, ramie, hemp, and bagasse because they readily decompose under normal conditions. Even recycled paper fibers can be used in many cases and are extremely inexpensive and plentiful. The fibers may include one or more filaments, fabrics, mesh or mats, and which may be co-extruded, or otherwise blended with or impregnated into, the polymer blends of the present invention.

The fibers used in making the sheets and other articles of the present invention preferably have a high length to width ratio (or "aspect ratio") because longer, narrower fibers can impart more strength to the polymer blend while adding significantly less bulk and mass to the matrix than thicker fibers. The fibers will have an aspect ratio of at least about 10:1, preferably greater than about 25:1, more preferably greater than about 100:1, and most preferably greater than about 250:1.

The amount of fibers added to the polymer blends will vary depending upon the desired properties of the final molded article, with tensile strength, toughness, flexibility, and cost being the principle criteria for determining the amount of fiber to be added in any mix design. Accordingly, the concentration of fibers within the polymer blends of the present invention can be included in a broad range from 0% to about 90% by weight of the polymer blend. Preferably, fibers will be included in an amount in a range from about 3% to about 80% by weight of the polymer blend, more preferably in a range from about 5% to about 60% by weight, and most preferably in a range from about 10% to about 30% by weight of the polymer blend.

3. Organic Fillers

The polymer blends of the present invention may also include a wide range of organic fillers. Depending on the melting points of the polymer blend and organic filler being added, the organic filler may remain as a discrete particle and constitute a solid phase separate from the thermoplastic phase, or it may partially or wholly melt and become partially or wholly associated with the thermoplastic phase.

Organic fillers may comprise a wide variety of natural occurring organic fillers such as, for example, seagel, cork, seeds, gelatins, wood flour, saw dust, milled polymeric materials, agar-based materials, and the like. Organic fillers may also include one or more synthetic polymers of which there is virtually endless variety. Because of the diverse nature of organic fillers, there will not generally be a preferred concentration range for the optional organic filler component.

C. Natural Polymers

In addition to TPS, other natural polymers that may be used within the polymer blends of the present invention include derivatives of starch and cellulose, proteins and derivatives thereof, and other polysaccharides such as polysaccharide gums and derivatives thereof.

Examples of starch derivatives include, but are not limited to, modified starches, cationic and anionic starches, and starch esters such as starch acetate, starch hydroxyethyl ether, alkyl starches, dextrins, amine starches, phosphates starches, and dialdehyde starches.

Examples of derivatives of cellulose include, but are not limited to, cellulosic esters (e.g., cellulose formate, cellulose acetate, cellulose diacetate, cellulose propionate, cellulose butyrate, cellulose valerate, mixed esters, and mixtures thereof) and cellulosic ethers (e.g., methylhydroxyethylcellulose, hydroxymethylethylcellulose, carboxymethylcellulose, methylcellulose, ethylcellulose, hydroxyethylcellulose, hydroxyethylpropylcellulose, and mixtures thereof).

Other polysaccharide-based polymers that can be incorporated into the polymer blends of the invention include alginic acid, alginates, phycocolloids, agar, gum arabic, guar gum, acacia gum, carrageenan gum, flircellaran gum, ghatti gum, psyllium gum, quince gum, tamarind gum, locust bean gum, gum karaya, xanthan gum, and gum tragacanth, and mixtures or derivatives thereof.

Suitable protein-based polymers include, for example, Zein® (a prolamine derived from corn), collagen (extracted from animal connective tissue and bones) and derivatives thereof such as gelatin and glue, casein (the principle protein in cow milk), sunflower protein, egg protein, soybean protein, vegetable gelatins, gluten and mixtures or derivatives thereof.

D. Non Biodegradable Polymers

Although an important feature of the polymer blends is that they are generally considered to be biodegradable, it is certainly within the scope of the invention to include one or more polymers which are not biodegradable. If the nonbiodegradable polymer generally comprises a disperse phase rather than the dominant continuous phase, polymer blends including a nonbiodegradable polymer will nevertheless be biodegradable, at least in part. When degraded, the polymer blend may leave behind a nonbiodegradable residue that nevertheless is superior to entire sheets and films of non-biodegradable polymer.

Examples of common nonbiodegradable polymers suitable for forming sheets and films include, but are not limited to, polyethylene, polypropylene, polybutylene, PET, PETG, polyvinyl chloride, PVDC, polystyrene, polyamides, nylon, polycarbonates, polysulfides, polysulfones, copolymers including one or more of the foregoing, and the like.

IV. Polymer Blends

A. Concentration Ranges

The concentrations of the various components within the polymer blend will depend on a number of factors, including the desired physical and mechanical properties of the final blend, the performance criteria of articles to be manufactured from a particular blend, the processing equipment used to manufacture and convert the blend into the desired article of manufacture, and the particular components within the blend. One of ordinary skill in the art will be able, in light of the specific examples and other teachings disclosed herein, to select and optimize the concentrations of the various components through routine testing.

In view of the wide variety of polymer blends within the scope of the invention, as well as the wide variety of different properties that may be engineered within the blends, the hard and soft polymers may be included within widely varying concentration ranges. The one or more stiff polymers within the inventive blends will preferably have a concentration in a range from about 20% to about 99% by weight of the biodegradable polymer blend, more preferably in a range from about 50% to about 98% by weight, and most preferably in a range from about 80% to about 95% by weight of the polymer blend.

Similarly, the soft polymers will preferably have a concentration in a range from about 1% to about 80% by weight of the biodegradable polymer blend, more preferably in a range from about 2% to about 50% by weight, and most preferably in a range from about 5% to about 20% by weight of the polymer blend.

The foregoing ranges are measured in terms of the blend of hard and soft polymers exclusive of any optional components that may be added, as described and identified above.

B. Properties of the Polymer Blends

The polymer blends may be engineered to have any desired property. In the case of sheets or films intended to be used as "wraps", such as wraps used to enclose meats, other perishable food items, and especially fast food items (e.g., sandwiches, burgers and dessert items), it will generally be desirable to provide sheets and films having good "deadfold" properties so that once folded, wrapped or otherwise manipulated into a desired orientation, such wraps will tend to maintain their orientation so as to not spontaneously unfold or unwrap, as which occurs with a large number of plastic sheets and films (e.g., polyethylene).

In order to improve the dead-fold properties of sheets or films produced therefrom, biopolymers may be selected which yield blends having a relatively high Young's modulus, preferably greater than about 100 MPa, more preferably greater than about 150 MPa, and most preferably greater than about 200 MPa. In general, increasing the concentration of the stiff biopolymer will tend to increase the Young's modulus. The Young's modulus may also be increased by loading the polymer blends with one or more fillers, such as particulate or fibrous fillers, as described above.

In addition to, or instead of, increasing the Young's modulus to improve dead-fold, the sheets or films according to the invention may be optionally processed to increase the "bulk hand feel" of a sheet, which is done by disrupting the generally planar nature of the sheet or film. This can be done, for example, by embossing, crimping, quilting or otherwise texturing the sheet so as to have a series of hills and valleys rather than simply a planar sheet. This may be done, for example, by passing the sheet or film through a pair of knurled or other embossing-type rollers. Such texturing increases the ability of a sheet to take and maintain a fold, thus improving the dead-fold properties of the sheet.

Another important property of the biodegradable blends according to the invention is that when such blends are blown, extruded or otherwise formed into sheets and films, such sheets and films are readily printable without further processing. Thus, another advantage of utilizing the inventive polymer blends in the manufacture of wraps is that such blends are generally able to accept and retain print much more easily than conventional plastics or waxed papers. Many plastics and waxes are highly hydrophobic and must be surface oxidized in order to provide a chemically receptive surface to which ink can adhere. Biopolymers, on the other hand, typically include oxygen-containing moieties, such as ester or amide groups, to which inks can readily adhere.

C. Methods of Manufacturing Polymer Blends, Sheets and Films

It is within the scope of the invention to employ any mixing apparatus known in the art of manufacturing thermoplastic compositions in order to form the polymer blends of the invention. Examples of suitable mixing apparatus that can be used to form the blends according to the invention include a twin-shafted kneader with meshing screws having kneading blocks sold by the Buss Company, a Brabender mixer, a Theysohn TSK 045 compounder, which is a twin-shaft extruder with shafts rotating in the same direction and which has multiple heating and processing zones, a Buss Ko-Kneader having a heatable auger screw, a Baker-Perkins MPC/V-30 double and single auger extruder, single or twin auger OMC extruders, a Model EPV 60/36D extruder, a BATTAGGION ME100 direct-current slow mixer, and a HAAKE Reomex extruder.

Many of the foregoing mixers are also extruders, which makes them suitable for extruding films or sheets from the inventive blends according to the invention. Alternatively, these blends can be made using transfer-line-injection technology where resin manufacturers can inject the various minor components of these blends into the main poly components during manufacture. One of ordinary skill in the art will be able to select and optimize an appropriate manufacturing apparatus according to the desired article to be manufactured.

In a preferred embodiment for manufacturing sheets and films, the sheets and films may be manufactured using a compounding twin screw extruder to prepare the blends, and a blown film or cast film line to make the films.

V. EXAMPLES OF THE PREFERRED EMBODIMENTS

The following examples are presented in order to more specifically teach compositions and process conditions for forming the biodegradable blends according to the present invention, as well as articles therefrom. The examples include various mix designs of the inventive biodegradable polymer blends as well various processes for manufacturing the blends and sheets and films therefrom.

Examples 1–3

Films were manufactured from biodegradable polymer blends having the following mix designs, with the concentrations being expressed in terms of weight percent of the entire polymer blend:

| Example | Biomax 6926 | Ecoflex-F | $SiO_2$ |
|---|---|---|---|
| 1 | 94.84% | 5% | 0.16% |
| 2 | 89.84% | 10% | 0.16% |
| 3 | 79.84% | 20% | 0.16% |

The foregoing polymer blends were blended and blown into films at Gemini Plastics, located in Maywood, Calif., using DuPont supplied BIOMAX 6926 (both new and old lots), a silica master batch in BIOMAX 6926 base resin supplied by DuPont, and ECOFLEX-F resin obtained from BASF. The films were blown using a Gemini film blowing extruder (L/D 24/1) equipped with a 2 inch barrier mixing screw containing a Maddock shear mixing tip, and a 4 inch diameter annular die with a die gap of 0.032–0.035".

Even though a typical quantity of silica antiblock was used (i.e., 0.16%), significant blocking of the film was observed for the film made using the mix design of Example 3 (i.e. 20% ECOFLEX); however, there was no observed blocking of the 5 and 10% ECOFLEX blends of Examples 1 and 2. For purposes of comparison, films of neat ECOFLEX and BIOMAX were manufactured. The neat ECOFLEX films were manufactured using BASF ECOFLEX-F resin and a 30% talc master batch in the same resin. The neat BIOMAX films (new and old) included 0.16% $SiO_2$, while the neat ECOFLEX films included 4.5% talc. The mechanical properties of the BIOMAX/ECOFLEX blend films and the control BIOMAX and neat ECOFLEX-F films were measured under ambient conditions. The data generated is show graphically in Charts 1–8 depicted in FIGS. 1–8, respectively.

Chart 1, depicted in FIG. 1, is a plot of the strain rate versus percent elongation at break for the various films tested. At 500 mm/min. strain rate, both new and old BIOMAX films displayed poor elongation. The neat ECOFLEX films and all of the films made from the BIOMAX-ECOFLEX blends had significantly better elongations than the neat BIOMAX films at all of the strain rates studied. On the other hand, the 20% ECOFLEX blend of Example 3 exhibited equal or better elongation compared to the neat ECOFLEX films at lower strain rates, even though these films included nearly 80% BIOMAX, which was shown to have very poor elongation.

Figure 2:
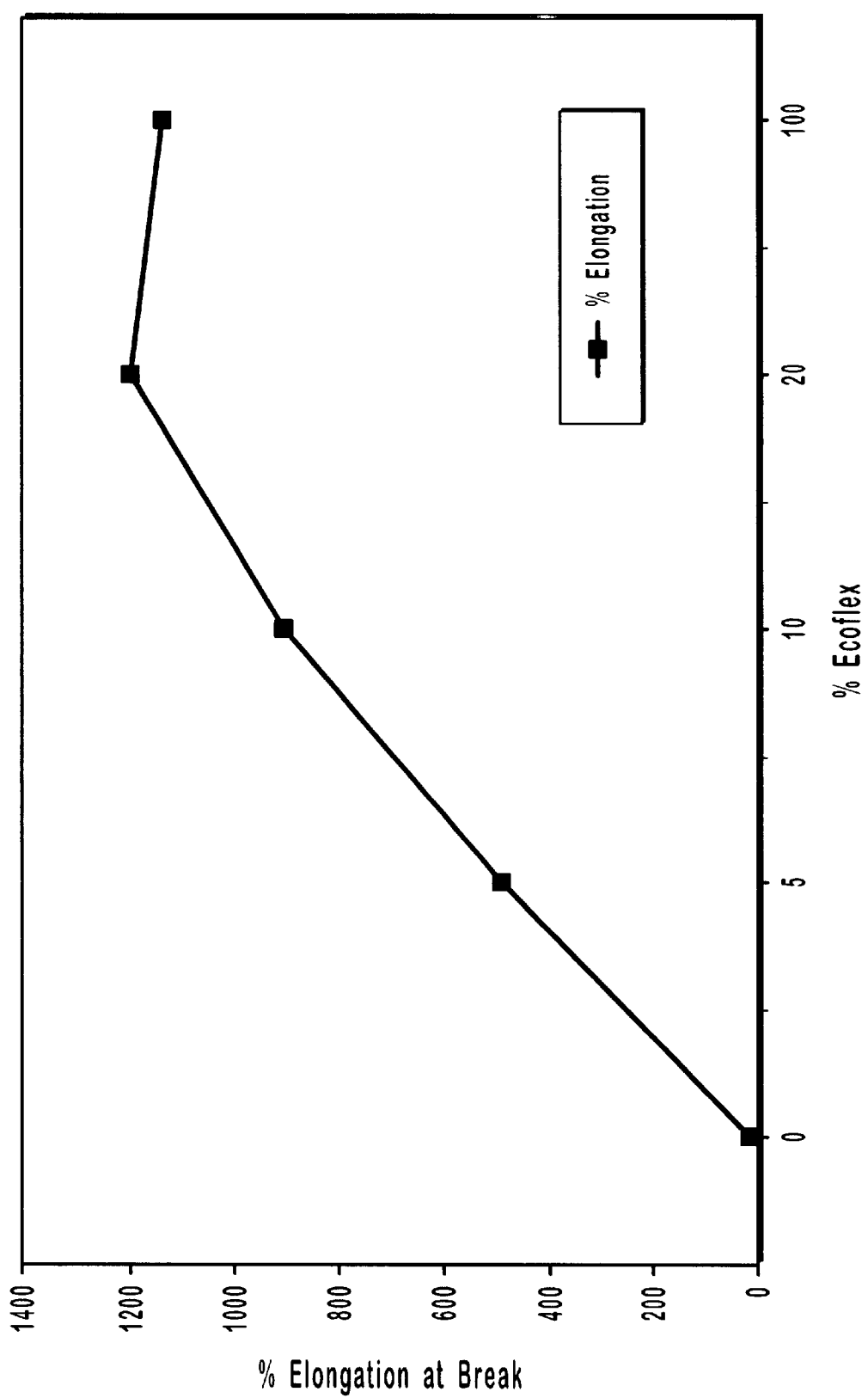
FIG. 2 is a plot of the percent elongation of various neat polymer and blended polymer films versus the concentration of ECOFLEX within the films at a fixed strain rate of 500 mm/min.

Chart 2, depicted in FIG. 2, is a plot of percent elongation versus percentage of ECOFLEX in the BIOMAX/ECOFLEX blends measured at a fixed strain rate of 500 mm/min. As represented by Chart 2, there was a nearly linear improvement in the percent elongation as the concentration of ECOFLEX was increased. Moreover, the 20% ECOFLEX blend of Example 3 had an elongation as good as the neat ECOFLEX films.

Figure 3:
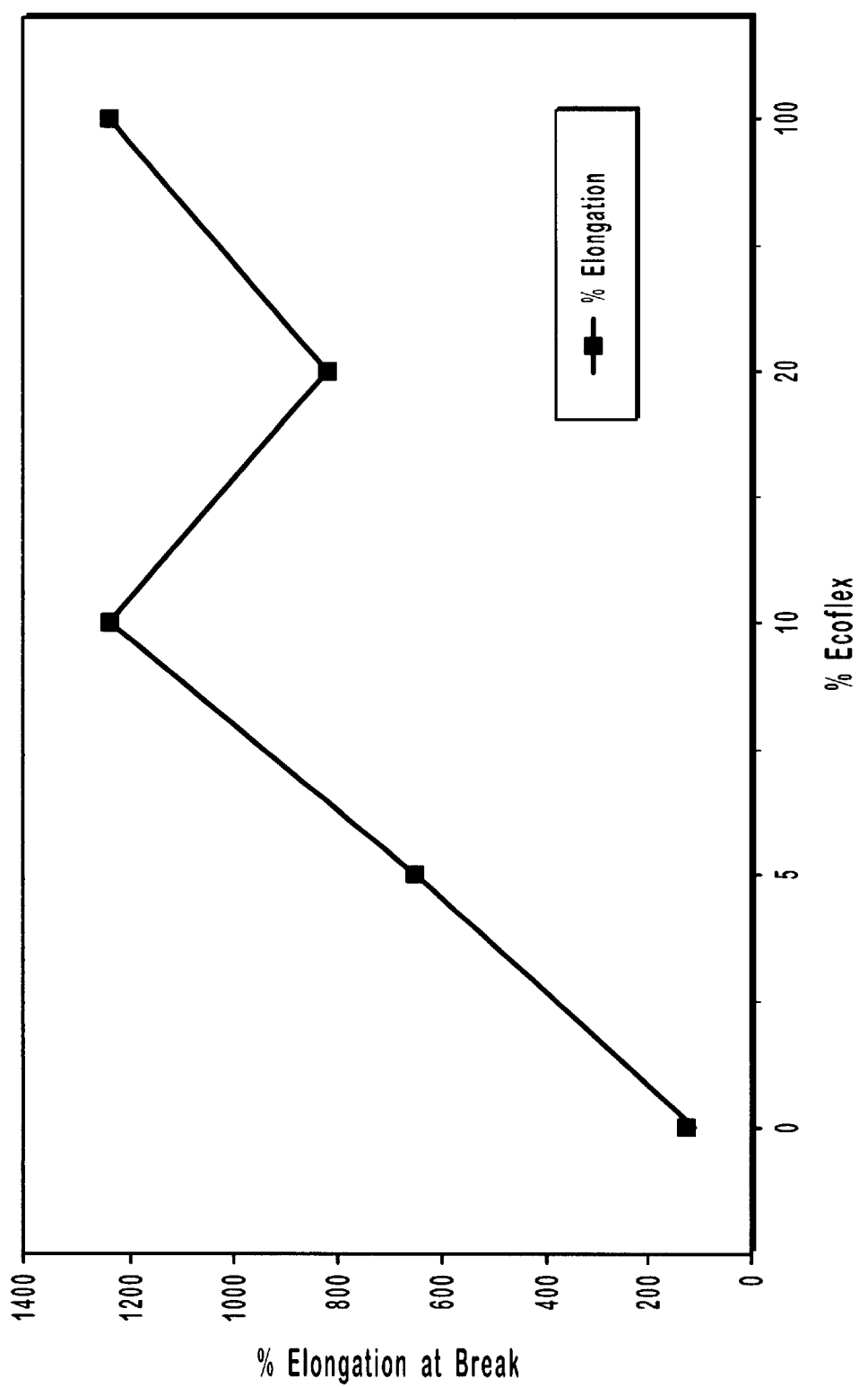
FIG. 3 is a plot of the percent elongation of various neat polymer and blended polymer films versus the concentration of ECOFLEX within the films at a fixed strain rate of 1000 mm/min.

Chart 3, depicted in FIG. 3, similarly plots the percent elongation versus the percentage of ECOFLEX in the BIOMAX/ECOFLEX blends measured at a fixed strain rate of 1000 mm/min. Again, a dramatic improvement in the elongation of the BIOMAX/ECOFLEX blend was seen as the concentration of ECOFLEX reached 10 and 20%, respectively, although the trend was not as clear as the data in Chart 2, measured at a fixed strain rate of 500 mm/min.

Figure 4:
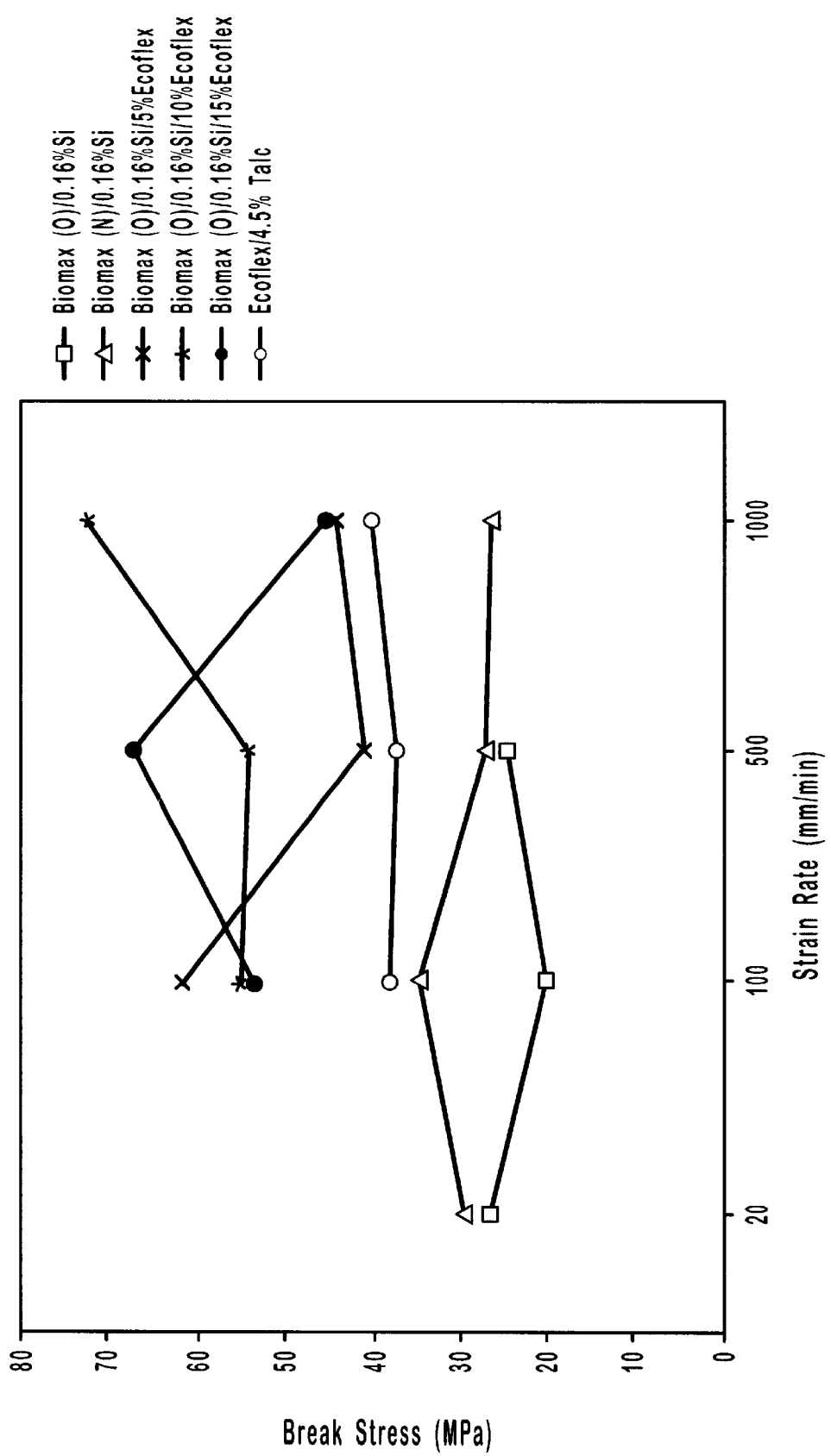
FIG. 4 is a plot of the break stress versus the applied strain rate for various neat and blended polymer films.

Chart 4, depicted in FIG. 4, is a plot of the strain rate versus break stress of the various films. Again, neat ECOFLEX and all of the BIOMAX/ECOFLEX blends had significantly better break stress than the neat BIOMAX films at all of the strain rates studied. Moreover, the BIOMAX/ECOFLEX blends had significantly better break stress than the neat ECOFLEX films at all strain rates, thus showing that the BIOMAX/ECOFLEX blends are all stronger in tensile strength than either of neat BIOMAX or ECOFLEX.

Figure 5:
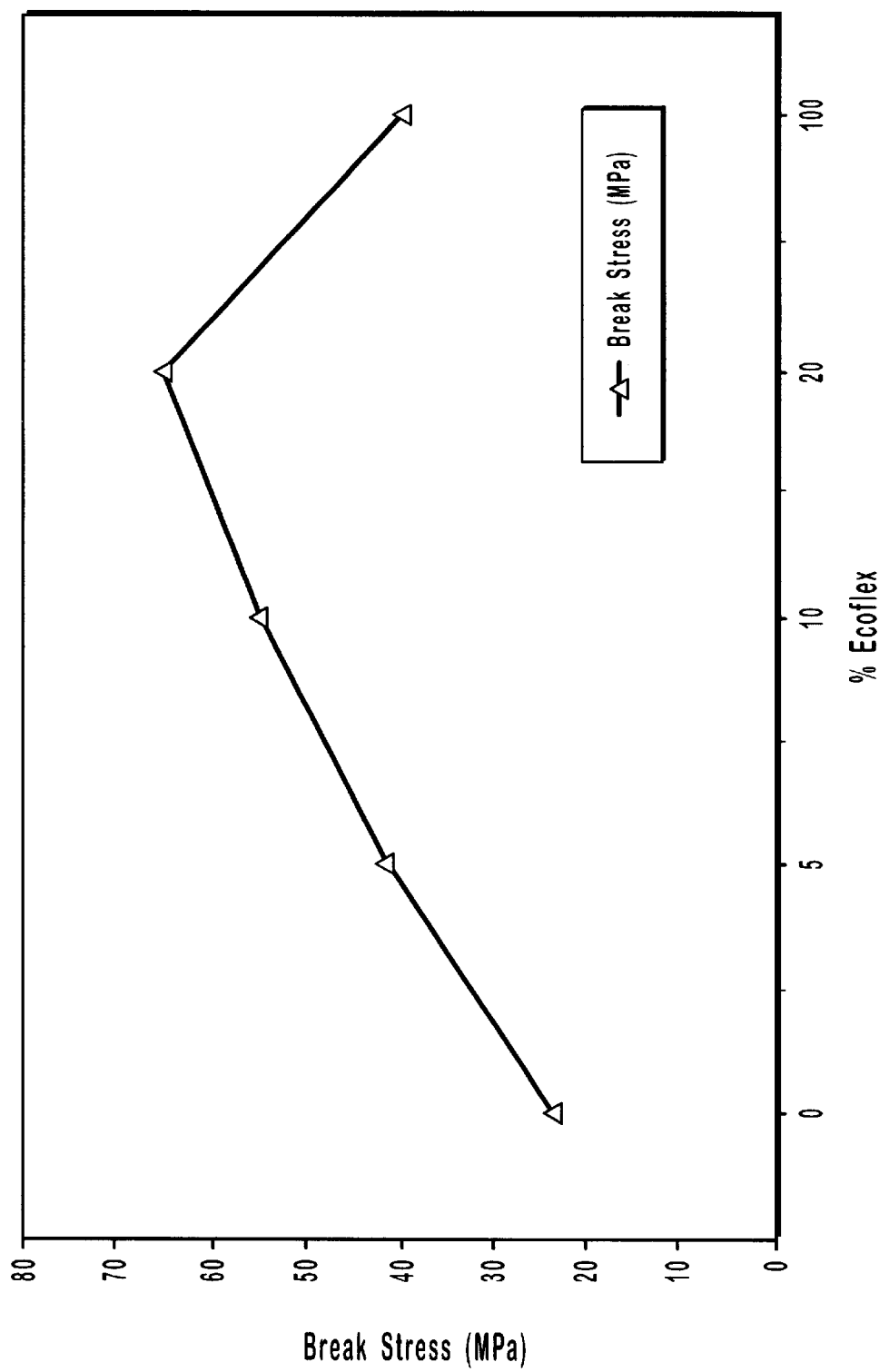
FIG. 5 is a plot of the break stress of various neat polymer and blended polymer films versus the concentration of ECOFLEX within the films at a fixed strain rate of 500 mm/min.

Chart 5, depicted in FIG. 5, is a plot of the break stress versus percent ECOFLEX in the BIOMAX/ECOFLEX blends of Examples 1–3 measured at a fixed strain rate of 500 mm/min. Once again, a nearly linear increase in break stress was observed as the concentration of ECOFLEX was increased. Moreover, the 20% blend of Example 3 exhibited the surprising and unexpected result of having nearly twice the break stress as the neat ECOFLEX film, and nearly three times the break stress as the neat BIOMAX film.

Figure 6:
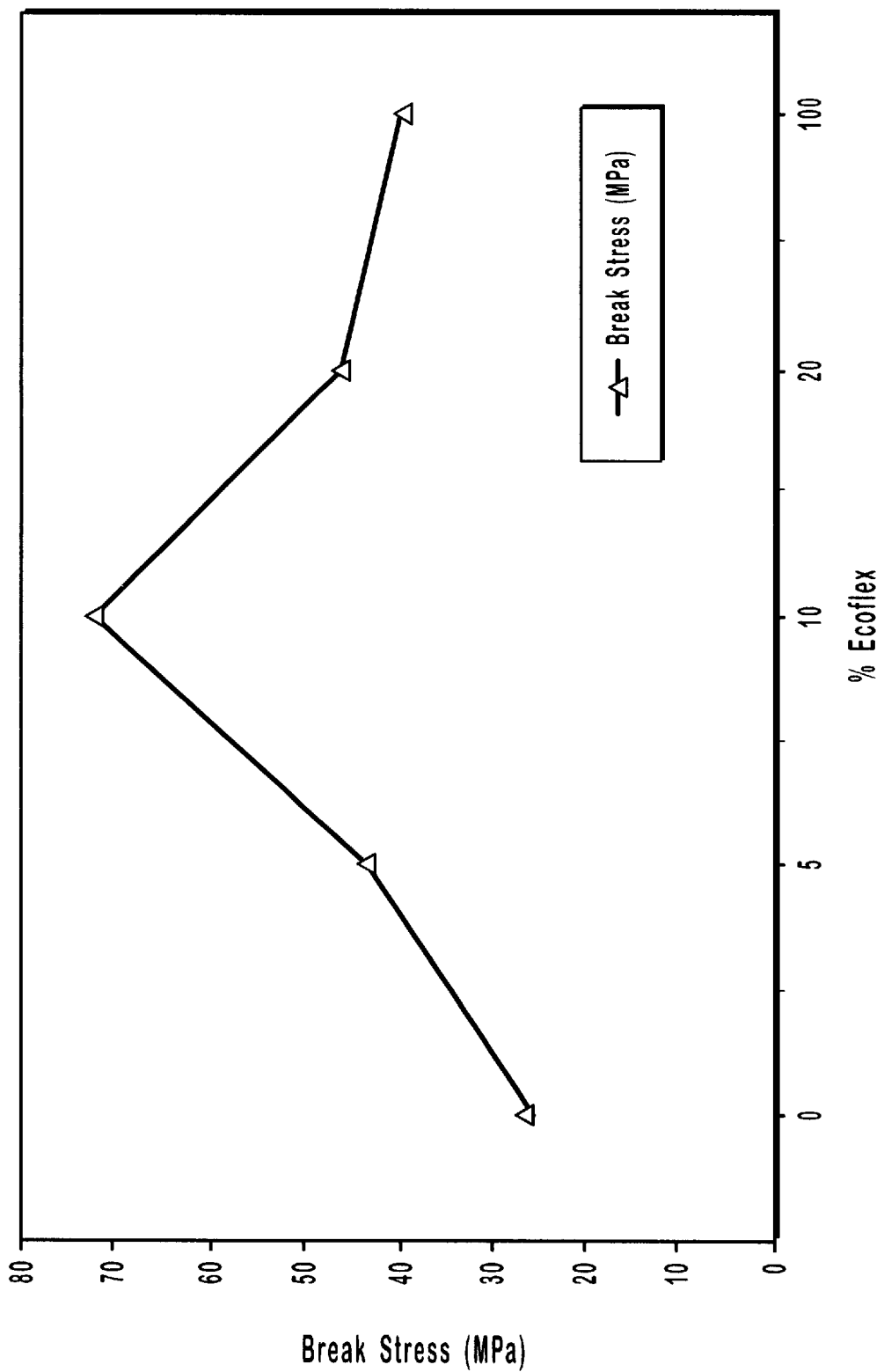
FIG. 6 is a plot of the break stress of various neat polymer and blended polymer films versus the concentration of ECOFLEX within the films at a fixed strain rate of 1000 mm/min.

Chart 6, depicted in FIG. 6, is a plot of the break stress versus percent ECOFLEX in the BIOMAX/ECOFLEX blends of Examples 1–3 measured at a fixed strain rate of 1000 mm/min. At this strain rate, the 10% ECOFLEX blend of Example 2 had the highest break stress, with a maximum peak stress of 72 MPa.

Figure 7:
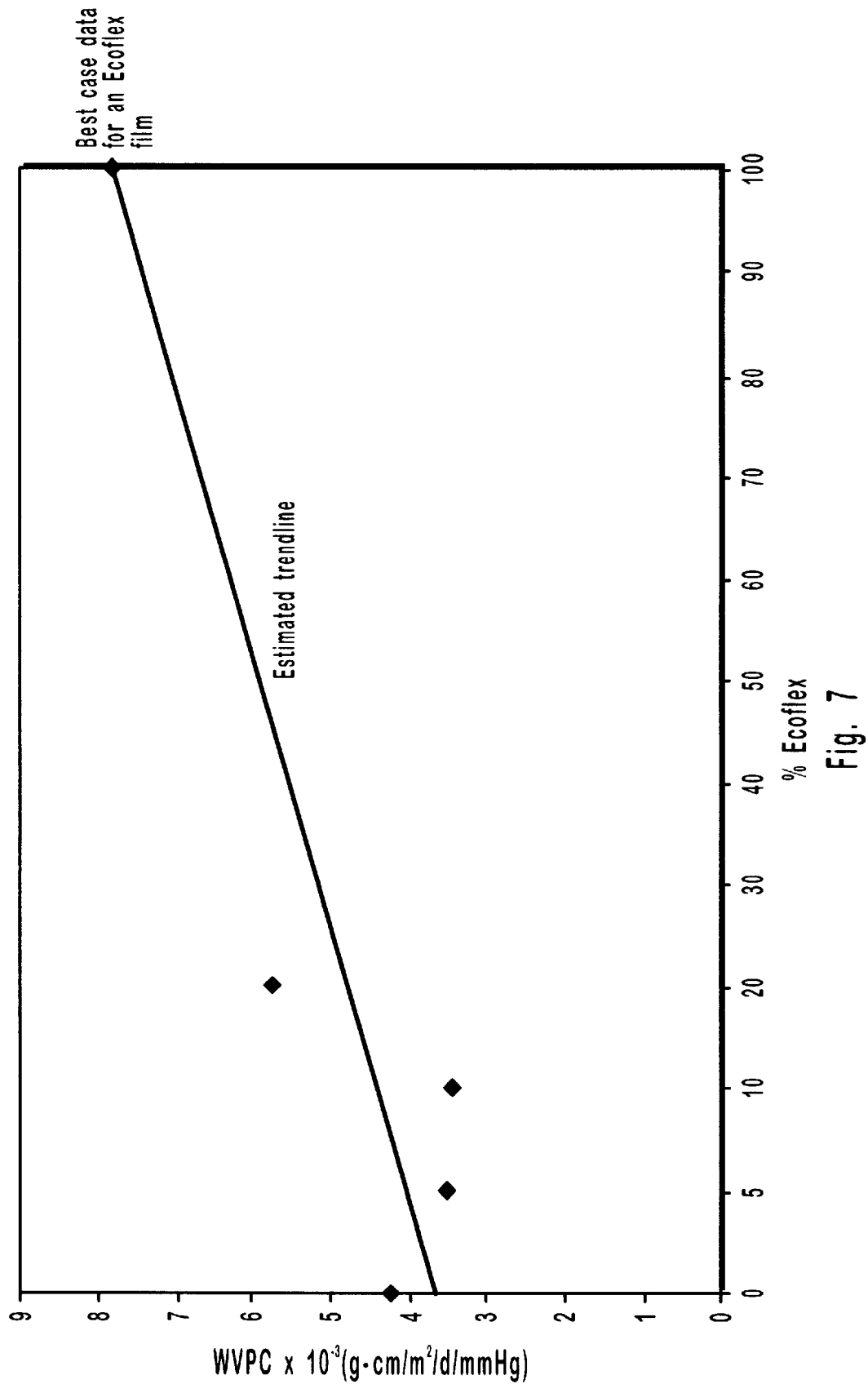
FIG. 7 is a plot of the Water Vapor Permeability Coefficients (WVPC) of various neat polymer and blended polymer films as a function of the concentration of ECOFLEX within the films, and an estimated trend line based on the lowest measured WVPC for a neat ECOFLEX film of $7.79 \times 10^{-3}$ g·cm/m$^2$/d/mm Hg.
Figure 8:
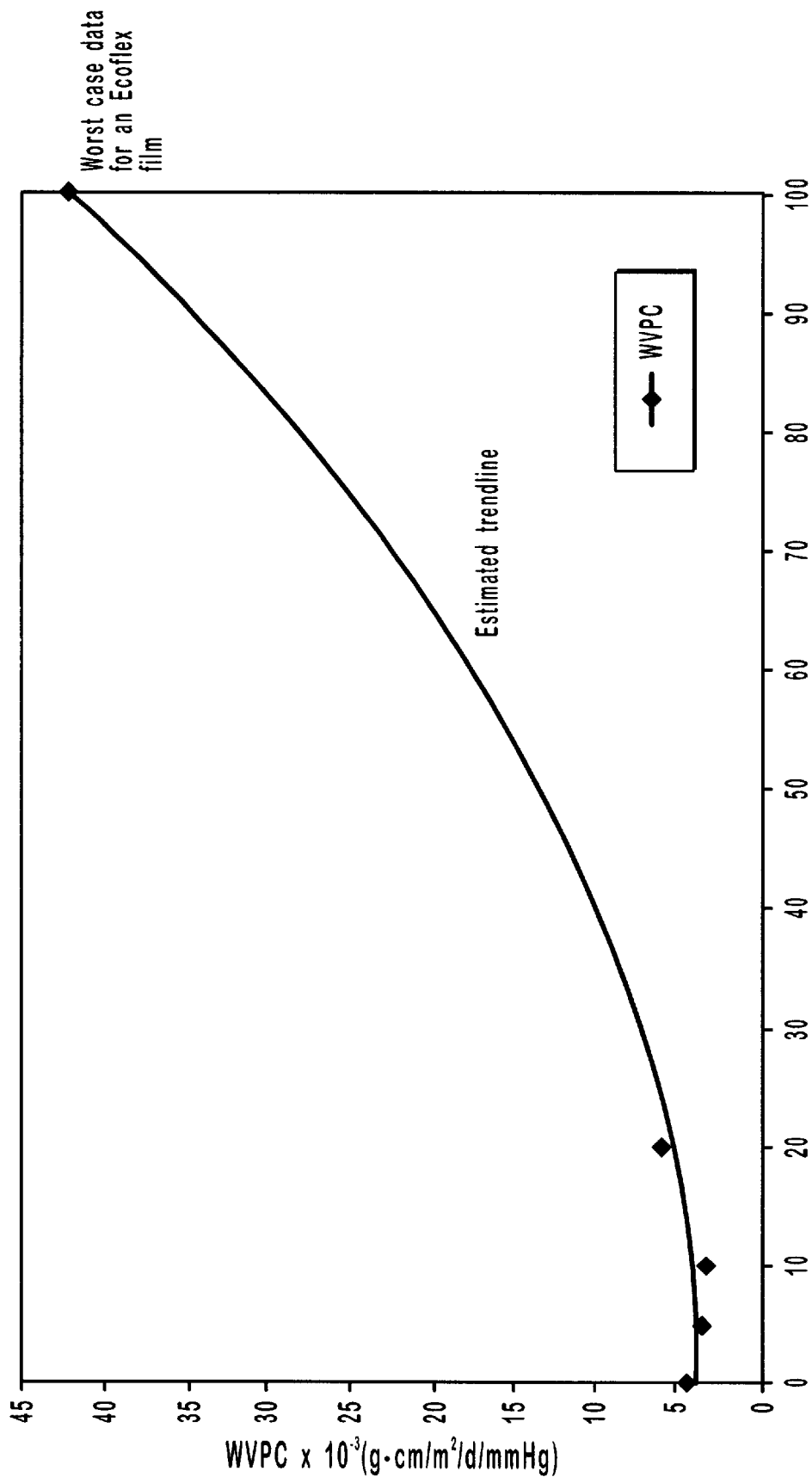
FIG. 8 is a plot of the Water Vapor Permeability Coefficients (WVPC) of various neat polymer and blended polymer films as a function of the concentration of ECOFLEX within the films, and an estimated trend line based on the highest measured WVPC for a neat ECOFLEX film of $42 \times 10^{-3}$ g·cm/m$^2$/d/mm Hg.

Charts 7 and 8, depicted in FIGS. 7 and 8, respectively, plot the water vapor permeability coefficient (WVPC) of the various films as a function of the concentration of ECOFLEX within the films. In Chart 7, the estimated trend line is based on a WVPC of $7.79 \times 10^{-3}$ g·cm/m²/d/mm Hg, which is the lowest measured WVPC for a neat ECOFLEX film. In Chart 8, the estimated trend line is alternatively based on a WVPC of $42 \times 10^{-3}$ g·cm/m²/d/mm Hg, which is the highest measured WVPC for a neat ECOFLEX film. The data in Charts 7 and 8 indicate that the water vapor barrier properties of the 5 and 10% ECOFLEX blends of Examples 1 and 2 were essentially the same as that of the neat BIOMAX film. The WVPC data for all samples were measured by the standard procedures described in the Test Method ASTM F 1249-90.

Figure 9:
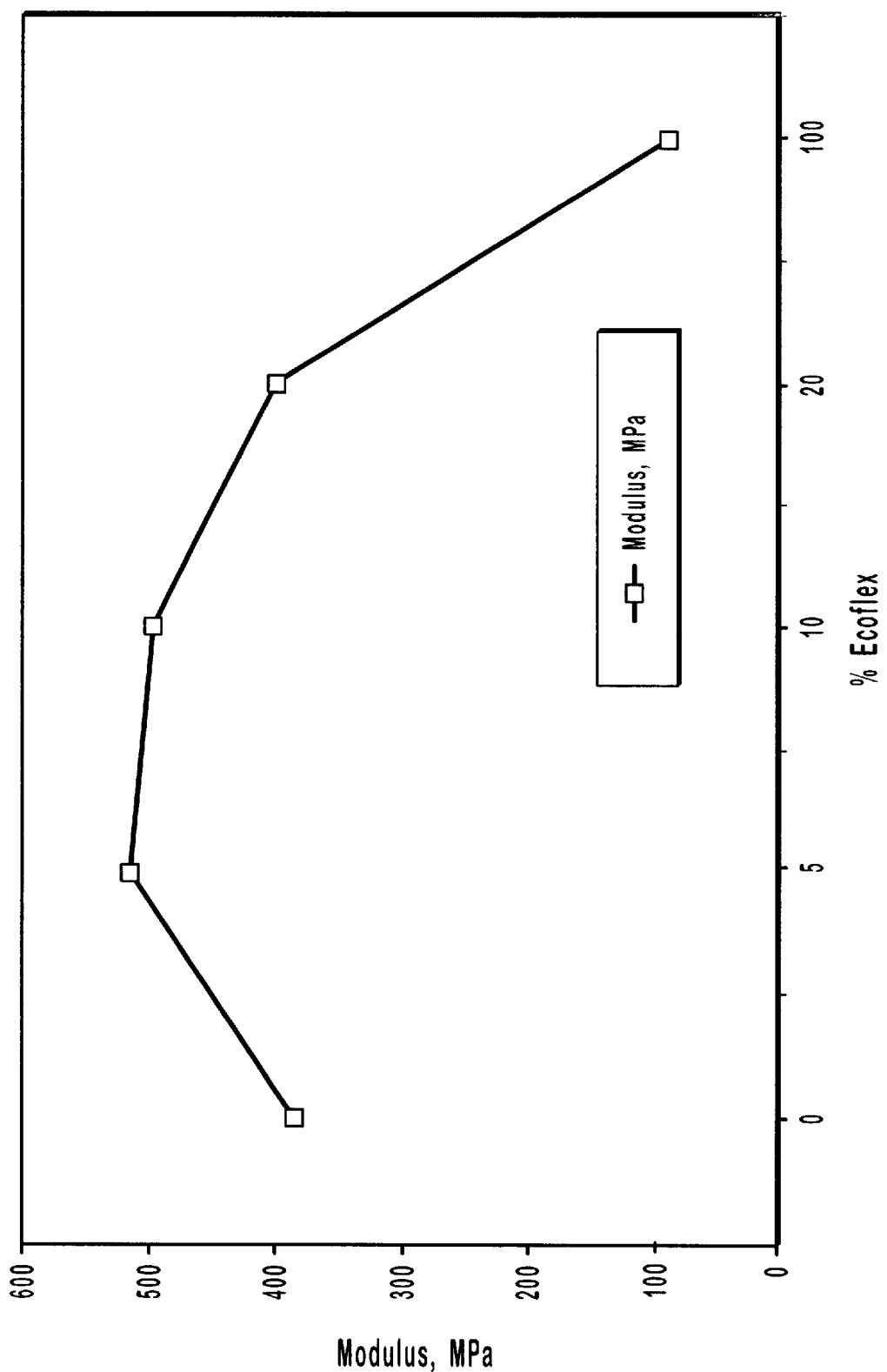
FIG. 9 is a plot of the modulus of various neat polymer and blended polymer films versus the concentration of ECOFLEX within the films.

Chart 9, depicted in FIG. 9, is a plot of the modulus of various films as a function of the concentration of ECOFLEX within the films. Surprisingly, the modulus of blends containing BIOMAX and ECOFLEX are significantly higher than of neat BIOMAX and ECOFLEX. Because one of the uses of the films manufactured according to the present invention is as a wrap having good dead-fold properties, and because the degree of dead-fold is believed to be related to the modulus of a film, blends of BIOMAX and ECOFLEX appear to have superior dead-fold properties over each of the neat BIOMAX and ECOFLEX films, with the 5% and 10% blends exhibiting the highest modulus.

Examples 4–5

Films were manufactured from biodegradable polymer blends having the following mix designs, with the concentrations being expressed in terms of weight percent of the entire polymer blends:

| Example | Biomax 6926 | Ecoflex-F | Talc |
|---------|-------------|-----------|------|
| 4 | 79.7% | 16.7% | 3.6% |
| 5 | 76.7% | 16.7% | 6.6% |

The films were blown using a Gemini film blowing extruder (L/D 24/1) equipped with a 2 inch barrier mixing screw containing a Maddock shear mixing tip, and a 4 inch diameter annular die with a die gap of 0.032–0.035". The film of Example 5 had better dead-fold properties than the film of Example 4, which might be attributable to the higher concentration of talc within the blend used in Example 5.

Example 6

A film was manufactured from a biodegradable polymer blend having the following mix design, with the concentration being expressed in terms of weight percent of the entire polymer blend:

| | |
|---|---|
| ECOFLEX-F | 20% |
| Thermoplastically Processable Starch | 50% |
| Polylactic Acid | 15% |
| Inorganic Filler | 15% |

The Thermoplastically Processable Starch was obtained from Biotec Biologische Natuverpackungen GmbH & Co., KG ("Biotec"), located in Emmerich, Germany. The polylactic acid was obtained from Cargill-Dow Polymers, LLC, located in Midland, Mich., USA. The inorganic filler was calcium carbonate obtained from OMYA, division Pluess-Staufer AG, located in Oftringen, Switzerland.

The foregoing blend was manufactured and blown into sheets using a proprietary extrusion line thermoplastic starch extrusion/film blowing apparatus manufactured and assembled specifically for Biotec. In particular, the extrusion/film blowing apparatus was manufactured by Dr. Collin GmbH, located in Ebersberg, Germany. A detailed description of an extrusion/film blowing apparatus similar to the one used by Biotec is set forth in U.S. Pat. No. 5,525,281. For purposes of disclosure, the foregoing patent is incorporated herein by specific reference.

The film had a modulus of 215.65 MPa. Thus, it had excellent dead-fold properties as a result of the inclusion of the inorganic filler and the polylactic acid, which is a generally stiff, crystalline polymer at room temperature. As set forth above, PLA has a glass transition temperature between 50–60° C. The ECOFLEX and thermoplastically processable starch (TPS) both acted as soft, low glass transition temperature polymers. The TPS, when blended with additional polymers and at very low water, has a glass transition temperature approaching −60° C. The ECOFLEX and TPS thus assisted the blowability and flexibility of the blend. The TPS also increased the natural polymer content, thus making the film more biodegradable.

Example 7

A film was manufactured from a biodegradable polymer blend having the following mix design, with the concentration being expressed in terms of weight percent of the entire polymer blend:

| | |
|---|---|
| Thermoplastically Processable Starch | 30% |
| BAK 1095 | 60% |
| Inorganic Filler | 10% |

The Thermoplastically Processable Starch was obtained from Biotec. The BAK 1095 was obtained from Bayer AG, located in Köln, Germany, and was an aliphatic-aromatic polyesteramide. The inorganic filler was calcium carbonate obtained from OMYA, division Pluess-Staufer AG, located in Oftringen, Switzerland.

The foregoing blend was manufactured and blown into sheets using the proprietary thermoplastic starch extrusion/film blowing apparatus described in Example 6. The film had excellent dead-fold properties as a result of the inclusion of the inorganic filler and the BAK 1095, which is a somewhat stiff, crystalline polymer at room temperature even though it is classified as "film grade". As set forth above, BAK 1095 behaves as if it has a glass transition temperature of at least 10° C. Because the glass transition temperature of BAK 1095 is relatively low compared to PLA, considerably more BAK could be included without destroying the film-blowing properties and flexibility of the resulting film. The TPS acted as the soft, low glass transition temperature polymer, and further assisted the blowability and flexibility of the blend. It also increased the natural polymer content, thus making the film more biodegradable.

Examples 8–12

Films were manufactured from biodegradable polymer blends having the following mix designs, with the concentrations being expressed in term of weight percent of the entire polymer blend:

| Example | Biomax 6926 | Ecoflex F | Talc | TiO$_2$ | CaCO$_3$ |
|---|---|---|---|---|---|
| 8 | 76% | 15% | 4.5% | 4.5% | — |
| 9 | 85.5% | 9.5% | — | 5% | — |
| 10 | 70% | 17.5% | — | 2.5% | 10% |
| 11 | 66% | 16.5% | — | 2.5% | 15% |
| 12 | 58% | 24% | — | 3% | 15% |

The talc was supplied by Luzenac, located in Englewood, Colo., having a particle size of 3.8 microns. The titanium dioxide was supplied by Kerr-McGee Chemical, LLC, located in Oklahoma City, Okla., grade TRONOX 470, having a particle size of 0.17 micron. The calcium carbonate was supplied by Omnia, located in Lucerne Valley, Calif., particle size of 2 microns. The foregoing blends were manufactured on a Werner Pfeiderer ZSK twin-screw extruder, and blown into sheets using a Gemini film blowing extruder (L/D 24/1) equipped with a 2 inch barrier mixing screw containing a Maddock shear mixing tip, and a 4 inch diameter die. All of the films had excellent dead-fold properties. The polymer blends of Examples 10–12 were also extruded into sheets using a single screw extruder and a 14 inch flat cast-film die, and the usual nip-rolls and film take-up assembly normal to such a system. All of these films also had excellent dead-fold properties.

VI. SUMMARY

In conclusion, the invention provides biodegradable polymers which can be readily formed into sheets and films that have strength and flexibility properties suitable for use as packaging materials.

The invention also provides biodegradable polymers which can be readily formed into sheets and films that are capable of being folded, sealed or otherwise manipulated in order to reliably enclose and seal a substrate therein.

The invention further provides biodegradable polymers which can be readily formed into sheets and films having sufficient flexibility while avoiding or minimizing problems such as undesired self-adhesion.

The invention yet provides biodegradable polymers which can be readily formed into sheets and films having increased temperature stability over a broad range of temperatures compared to existing biopolymers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A biodegradable polymer blend, comprising:
    at least one stiff synthetic biodegradable polymer having a glass transition temperature greater than about 10° C.;
    at least one soft synthetic biodegradable polymer having a glass transition temperature less than about −10° C. and a concentration that is less than 50% by combined weight of the stiff and soft biodegradable polymers; and
    at least one particulate filler,
    wherein the polymer blend is suitable for formation into at least one of sheets or films.

2. A biodegradable polymer blend as defined in claim 1, wherein the stiff synthetic biodegradable polymer comprises at least one of a modified polyethylene terephthalate, a polyesteramide, or an aliphatic polyester having repeating units of from 2 to 4 carbons atoms.

3. A biodegradable polymer blend as defined in claim 1, wherein the stiff synthetic biodegradable polymer comprises at least one of a modified polyethylene terephthalate in which a portion of the terephthalate groups are sulfonated and in which a portion of the ethylene groups are replaced with at least one of alkylene oxide or polyalkylene oxide groups, a terpolymer including units formed from glycolide, lactide and ε-caprolactone, a polyalkylene carbonate, or a polyesteramide formed from at least one diacid, at least one diol, and at least one amino acid.

4. A biodegradable polymer blend as defined in claim 1, wherein the soft biodegradable polymer comprises at least one of an aliphatic polyester having repeating units of at least 5 carbon atoms or a polyester including units formed from an aliphatic diol, an aliphatic diacid and an aromatic diacid.

5. A biodegradable polymer blend as defined in claim 3, wherein the soft biodegradable polymer comprises at least one of polyhydroxybutyrate-hydroxyvalerate copolymer, polybutylene succinate, polybutylene succinate reacted with hexamethyl diisocyanate, polybutylene succinate adipate, polyethylene succinate, polyethylene succinate reacted with hexamethyl diisocyanate, or an aliphatic-aromatic copolyester including units formed from adipic acid, dialkyl terephthalate, and at least one aliphatic diol.

6. A biodegradable polymer blend as defined in claim 1, further comprising at least one natural polymer or derivative thereof.

7. A biodegradable polymer blend as defined in claim 6, wherein the at least one natural polymer or derivative thereof comprises thermoplastically processable starch.

8. A biodegradable polymer blend as defined in claim 1, wherein the stiff synthetic biodegradable polymer is included in an amount of about 50% to about 98% by combined weight of the stiff and soft biodegradable polymers and the soft biodegradable polymer is included in a concentration in a range of about 2% to 50% by combined weight of the stiff and soft biodegradable polymers.

9. A biodegradable polymer blend as defined in claim 1, wherein the stiff synthetic biodegradable polymer is included in an amount of about 80% to about 95% by combined weight of the stiff and soft biodegradable polymers and the soft biodegradable polymer is included in a concentration in a range of about 5% to about 20% by combined weight of the stiff and soft biodegradable polymers.

10. A biodegradable polymer blend as defined in claim 1, wherein the stiff synthetic biodegradable polymer has a glass transition temperature greater than about 20° C.

11. A biodegradable polymer blend as defined in claim 1, wherein the stiff synthetic biodegradable polymer has a glass transition temperature greater than about 30° C.

12. A biodegradable polymer blend as defined in claim 1, wherein the stiff synthetic biodegradable polymer has a glass transition temperature greater than about 40° C.

13. A biodegradable polymer blend as defined in claim 1, wherein the soft biodegradable polymer has a glass transition temperature less than about −20° C.

14. A biodegradable polymer blend as defined in claim 1, wherein the soft biodegradable polymer has a glass transition temperature less than about −30° C.

15. A biodegradable polymer blend as defined in claim 1, further including at least one non biodegradable polymer.

16. A biodegradable polymer blend as defined in claim 1, wherein the particulate filler comprises an inorganic particulate filler material.

17. A biodegradable polymer blend as defined in claim 1, further including at least one plasticizer.

18. A biodegradable polymer blend as defined in claim 1, wherein the soft biodegradable polymer includes one or more diisocyanate chain extenders.

19. A biodegradable polymer blend as defined in claim 1, wherein the biodegradable polymer blend is in the form of a sheet or film.

20. A biodegradable polymer blend as defined in claim 19, wherein the sheet or film has dead-fold properties suitable for use as a packaging wrap.

21. A biodegradable polymer blend as defined in claim 19, wherein the sheet or film is textured so as to increase its bulk hand feel compared to a sheet that is not textured.

22. A biodegradable polymer blend as defined in claim 19, wherein the sheet or film includes printing on at least a portion thereof.

23. A biodegradable polymer blend as defined in claim 19, wherein the sheet or film is laminated with at least one additional sheet or film.

24. A biodegradable polymer blend as defined in claim 19, wherein the sheet or film is laminated with a molded article of manufacture.

25. A biodegradable polymer blend in the form of a sheet or film, comprising:
at least one synthetic biodegradable polymer having a glass transition temperature greater than about 10° C.; and
at least one biodegradable polymer having a glass transition temperature less than about 0° C.,
wherein the biodegradable sheet or film is textured so as to have dead-fold properties such that, once folded, wrapped or otherwise manipulated into a desired orientation, the sheet or film substantially maintains its orientation.

26. A biodegradable polymer blend in the form of a sheet or film, comprising:
at least one synthetic biodegradable polymer having a glass transition temperature greater than about 10° C.;
at least one biodegradable polymer having a glass transition temperature less than about 0° C.; and
at least one particulate filler in an amount so that the sheet or film has dead-fold properties such that, once folded, wrapped or otherwise manipulated into a desired orientation, the sheet or film substantially maintains its orientation.

27. A biodegradable polymer blend in the form of a sheet or film, comprising:
at least one stiff synthetic biodegradable polymer selected from the group consisting of modified polyethylene terephthalates, polyesteramides, polylactic acid, polylactic acid derivatives, polyalkylene carbonates, polyhydroxybutyrate, and terpolymers of polylactic acid, polyglycolic acid, and polycaprolactone;
at least one soft synthetic biodegradable polymer selected from the group consisting of aliphatic-aromatic copolyesters, polyhydroxyvalerate, polyhydroxyvalerate-hydroxybutyrate copolymers, polybutylene succinate, polybutylene succinate reacted with hexamethyl diisocyanate, polybutylene succinate adipate, polyethylene succinate, polyethylene succinate reacted with hexamethyl diisocyanate, and other succinate-based aliphatic polymers; and
optionally at least one of a particulate filler, fibrous filler, cellulose-based polymer, protein-based polymer, polysaccharide gum, nonbiodegradable polymer, or plasticizer,
wherein the stiff biodegradable polymer is included in an amount of about 20% to about 99% by combined weight of the stiff and soft biodegradable polymers,
wherein the soft biodegradable polymer is included in an amount of about 1% to about 80% by combined weight of the stiff and soft biodegradable polymers.

28. A biodegradable polymer blend, comprising:
at least one stiff synthetic biodegradable polymer having a glass transition temperature greater than about 10° C.; and
at least one soft synthetic biodegradable polymer having a glass transition temperature less than about 0° C. and comprising at least one aliphatic-aromatic copolyester comprising units formed from at least one type of aliphatic diol, at least one type of aliphatic diacid, and at least one type of aromatic diacid;
wherein the polymer blend is suitable for formation into at least one of sheets or films.

29. A biodegradable polymer blend as defined in claim 28, wherein the aliphatic-aromatic copolyester comprises units formed from adipic acid, dialkyl terephthalate, and at least one type of aliphatic diol.

30. A biodegradable polymer blend as defined in claim 28, further comprising at least one natural polymer or derivative thereof.

31. A biodegradable polymer blend as defined in claim 30, wherein the natural polymer or derivative thereof comprises at least one of starch or a starch derivative.

32. A biodegradable polymer blend in the form of a sheet or film formed by the process comprising:
(a) mixing together and heating at least one stiff synthetic biodegradable polymer having a glass transition temperature greater than about 10° C., at least one soft synthetic biodegradable polymer having a glass transition temperature less than about −10° C., and at least one particulate filler in a manner so as to form a thermoplastic melt in which the particulate filler is mixed throughout the thermoplastic melt; and
(b) forming the thermoplastic melt into a sheet or film.

* * * * *

UNITED STATES PATENT AND TRADEMARK OFFICE
CERTIFICATE OF CORRECTION

PATENT NO. : 6,573,340 B1  Page 1 of 1
DATED : June 3, 2003
INVENTOR(S) : Kishan Khemani et al.

It is certified that error appears in the above-identified patent and that said Letters Patent is hereby corrected as shown below:

Title page,
Item [75], Inventors, please delete "Per Just Andersen" as a named inventor
Item [57], ABSTRACT,
Line 21, after "by the" delete "their"
Item [56], U.S. PATENT DOCUMENTS, insert -- 6,326,440  12/2001  Terada et al. --; and -- 6,350,530  02/2002  Morikawa et al. --

Column 4,
Line 14, after "amorphous." start a new paragraph

Column 9,
Line 10, after "bacteria" insert a period

Column 11,
Line 13, after "polymerizing" change "E-caprolactone" to -- ε-caprolactone --

Column 20,
Line 38, before "graphically" change "show" to -- shown --

Signed and Sealed this

Eleventh Day of November, 2003

JAMES E. ROGAN
*Director of the United States Patent and Trademark Office*

UNITED STATES PATENT AND TRADEMARK OFFICE
CERTIFICATE OF CORRECTION

| | | |
|---|---|---|
| PATENT NO. | : 6,573,340 B1 | Page 1 of 1 |
| APPLICATION NO. | : 09/648471 | |
| DATED | : June 3, 2003 | |
| INVENTOR(S) | : Kishan Khemani et al. | |

It is certified that error appears in the above-identified patent and that said Letters Patent is hereby corrected as shown below:

On the Title Page,
Item [75], Inventors, please delete "Per Just Andersen" as a named inventor Signed and Sealed this Seventh Day of September, 2010

David J. Kappos
*Director of the United States Patent and Trademark Office*